(12) United States Patent
Nahum

(10) Patent No.: US 6,992,778 B2
(45) Date of Patent: Jan. 31, 2006

(54) METHOD AND APPARATUS FOR SELF-CALIBRATION OF A TUNABLE-SOURCE PHASE SHIFTING INTERFEROMETER

(75) Inventor: Michael Nahum, Kirkland, WA (US)

(73) Assignee: Mitutoyo Corporation, Kanagawa (JP)

( * ) Notice: Subject to any disclaimer, the term of this patent is extended or adjusted under 35 U.S.C. 154(b) by 272 days.

(21) Appl. No.: 10/638,147

(22) Filed: Aug. 8, 2003

(65) Prior Publication Data

US 2005/0030550 A1 Feb. 10, 2005

(51) Int. Cl.
*G01B 9/02* (2006.01)
(52) U.S. Cl. .................................. 356/512; 356/521
(58) Field of Classification Search ................ 356/489, 356/495, 511, 512
See application file for complete search history.

(56) References Cited

U.S. PATENT DOCUMENTS

| | | | |
|---|---|---|---|
| 5,289,260 A * | 2/1994 | Miyazaki et al. ........... 356/521 |
| 5,589,938 A | 12/1996 | Deck |
| 5,777,741 A | 7/1998 | Deck |
| 5,956,355 A * | 9/1999 | Swanson et al. ............ 356/479 |
| 6,108,131 A | 8/2000 | Hansen et al. |
| 6,122,103 A | 9/2000 | Perkins et al. |
| 6,243,199 B1 | 6/2001 | Hansen et al. |
| 6,304,330 B1 * | 10/2001 | Millerd et al. .............. 356/521 |
| 6,469,793 B1 * | 10/2002 | Stanton ...................... 356/521 |
| 6,552,808 B2 * | 4/2003 | Millerd et al. .............. 356/521 |
| 2002/0003628 A1 * | 1/2002 | James et al. ................ 356/521 |
| 2004/0070767 A1 * | 4/2004 | Tobiason et al. ........... 356/495 |
| 2004/0080754 A1 * | 4/2004 | Tobiason et al. ........... 356/495 |
| 2005/0030550 A1 * | 2/2005 | Nahum ....................... 356/521 |
| 2005/0046863 A1 * | 3/2005 | Millerd et al. .............. 356/521 |

OTHER PUBLICATIONS

Colucci, D., and Peter Wizinowich, "Millisecond Phase Acquisition at Video Rates," *Applied Optics* 31(28):5919-5925, Oct. 1, 1992.

Smythe, R., and R. Moore, "Instantaneous Phase Measuring Interferometry," *Optical Engineering* 23(4):361-364, Jul./Aug. 1984.

* cited by examiner

*Primary Examiner*—Gregory J. Toatley, Jr.
*Assistant Examiner*—Patrick Connolly
(74) *Attorney, Agent, or Firm*—Christensen O'Connor Johnson Kindness PLLC

(57) ABSTRACT

A conventional phase shifting interferometer that is used for measuring distances (e.g., in the micron range) typically provides two orthogonal, or quadrature, signals. The output signals typically include an offset that introduces a related measurement error unless it is compensated or eliminated. A standard way of eliminating offsets is to generate and/or process additional signals that are phase shifted by 180 degrees, or other known amounts. In contrast, the present invention provides a signal indicative of the offset contribution to a detector signal in an interferometer by varying the wavelength of radiation from the illumination source of the interferometer during the time that the offset determining signal is acquired or integrated by that detector. The method can be conveniently implemented with each signal detection channel of an interferometer, for a variety of interferometer designs. The method determines the offset error within a very short time period and without the need to provide additional or adjusted optical paths, or controlled phase shifts.

34 Claims, 13 Drawing Sheets

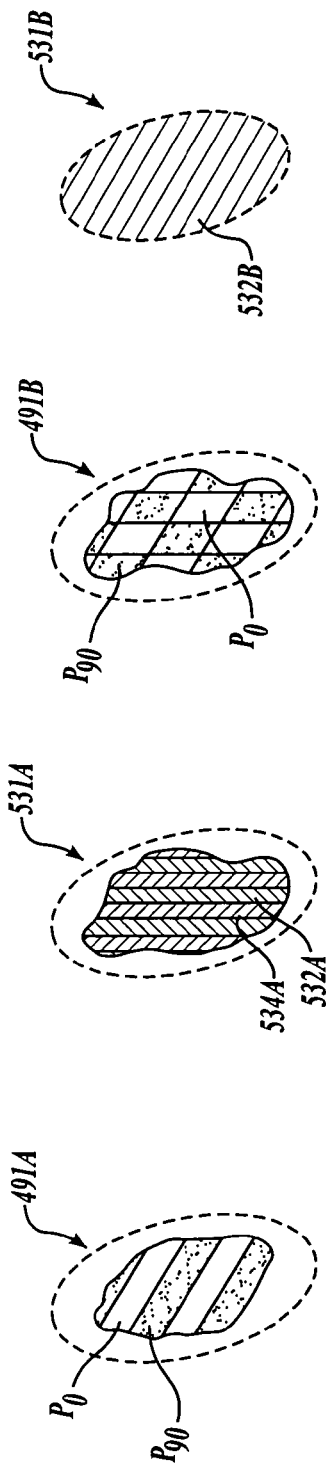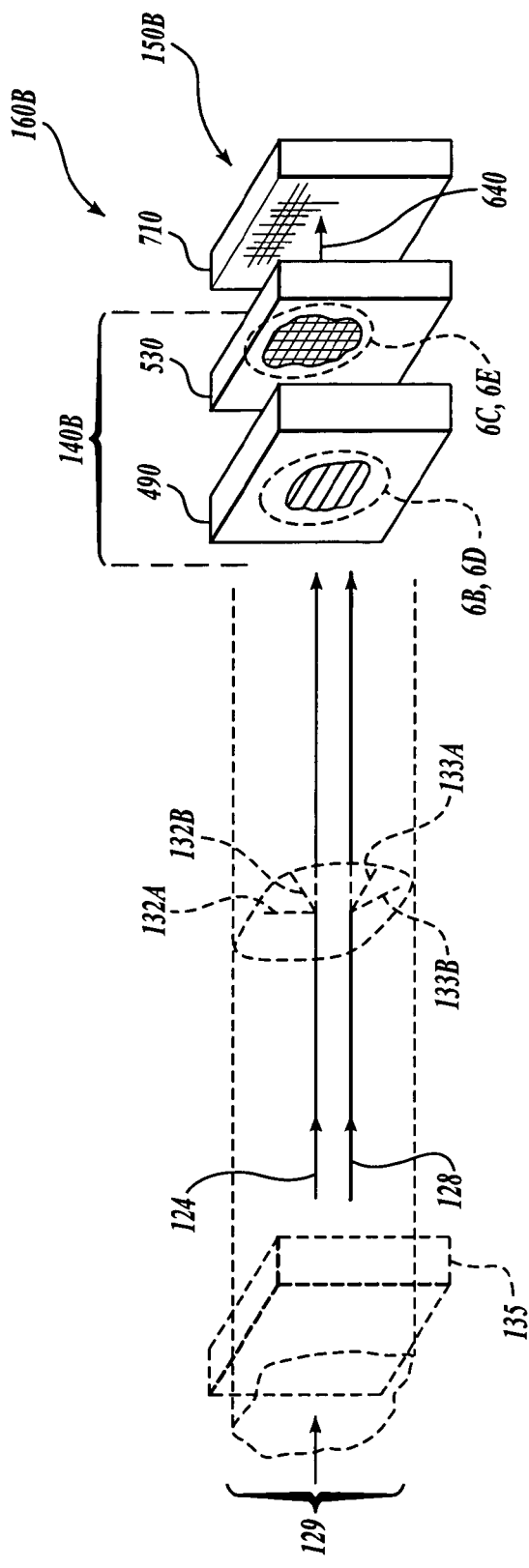

METHOD AND APPARATUS FOR SELF-CALIBRATION OF A TUNABLE-SOURCE PHASE SHIFTING INTERFEROMETER

FIELD OF THE INVENTION

This invention relates generally to interferometers, and more particularly to a method and apparatus for self-calibration of a tunable-source phase shifting interferometer.

BACKGROUND OF THE INVENTION

A number of phase shifting interferometer designs (as well as other types of interferometer designs used for measuring distances) are intended to provide 2 quadrature signals, ideally orthogonal output signals $V_1$ ideal and $V_2$ ideal as shown by EQUATIONS 1 and 2 below:

$$V_1 ideal = \operatorname{Sin} \frac{2\pi}{\lambda} z \quad \text{(Eq. 1)}$$

$$V_2 ideal = \operatorname{Cos} \frac{2\pi}{\lambda} z \quad \text{(Eq. 2)}$$

where λ is the wavelength of radiation used in the interferometer and z is the optical pathlength difference (OPD) between the interfering test object path light beam and reference path light beam. These two quadrature input signals of an interferometer should ideally both arise from light coming from precisely the same portion of the test object. The OPD z for that portion of the test object can then be determined to high resolution within a particular wavelength from EQUATION 3, which is described herein as providing "signal interpolation" for the value of z, or an "interpolated" value for z, or an interpolated interferometer measurement, within a particular wavelength:

$$z = \frac{\lambda}{2\pi} \operatorname{Tan}^{-1} \frac{V_1 ideal}{V_2 ideal}. \quad \text{(Eq. 3)}$$

However, in practical interferometers, the output signals are better described by the general forms shown in EQUATIONS 4 and 5:

$$V_1 = C_1 + A_1 \operatorname{Sin} \frac{2\pi}{\lambda} z \quad \text{(Eq. 4)}$$

$$V_2 = C_2 + A_2 \operatorname{Cos} \frac{2\pi}{\lambda} z \quad \text{(Eq. 5)}$$

Where $C_1$ and $C_2$ are offset or "DC" components in the signals and $A_1$ and $A_2$ are the "AC" signal amplitudes. The offset components of the signals arise from a number of sources. For example, a primary contribution comes from the nominal DC intensity of each of the interfering light beams that contribute to each interferometer output signal. This will vary with the intensity of the laser source, for example. Furthermore, it should be appreciated that a primary cause of variations in the nominal DC intensity of the object beams, or portions of the object beams, is that there are generally variations in the effective reflectivity of any particular portion of the test object. Similar effects may arise in the reference beams as well. However, the reflectivity of the reference mirror is generally more uniform, and more stable, than that of the various "uncontrolled" test objects. Additional contributions to offset arise from various ambient light contributions, as well as offsets associated with the detectors and the associated signal conditioning electronics and the like used to detect and measure the signals $V_1$ and $V_2$, for example.

Thus, even if A1=A2, if offsets are present in the signals, the signals depart from the form expected in EQUATION 3, and the resulting interpolated z values include related errors. Thus, for high accuracy interpolation, it is necessary to eliminate or compensate the offsets prior to computation of the interpolated value.

A number of different methods have been designed for eliminating or compensating such offsets in phase shifting interferometers. For example, U.S. Pat. No. 6,304,330, which is incorporated herein by reference for all of its relevant teachings, discloses a novel multiple phase-shifting image generating structure that combines a wavefront-spreading element, a phase-shifting interference element and a sensing element. By combining the wavefront-spreading element, the phase-shifting interference element, and the sensing element, the multiple phase-shifting image generating structure shown in the '330 patent is able to convert many sources of potential error in interferometry measurements, including some contributors to signal offset components, into common-mode errors. That is, these errors, in view of the signals provided by the multiple phase-shifting image generating structure disclosed in the '330 patent, equally affect multiple measurement signals provided in that system. As a result, the magnitude and direction of these common-mode errors can be determined and substantially eliminated by properly processing the interferometry signals provided by the multiple phase-shifting image generating structure disclosed in the '330 patent.

However, the structure and methods of the '330 patent, as well as other known prior art methods for eliminating or compensating offset errors, generally require either additional optical paths or means for introducing precisely controlled path length variations, as well as the associated additional components, in order to provide the required signals. Furthermore, residual sources of offset error generally remain in known prior art systems. Thus, systems and methods that could overcome the foregoing disadvantages, separately, or in combination, would be desirable.

SUMMARY OF THE INVENTION

As mentioned previously, known methods for eliminating or compensating offset errors generally provide signals in addition to V1 and V2, by providing corresponding optical paths or controllable path length variations. These additional signals are phase shifted by controlled and known amounts. For example, it is common to intentionally introduce an additional optical path length difference that is an odd multiple of λ/2 into such signals, which effectively inverts the AC component of such signals in comparison to other signals provided by the interferometer and allows removal or compensation of certain offset errors by methods described in greater detail below.

In contrast, the present invention provides systems and methods for providing signals indicative of, or usable to determine, the offset contribution to various detector channel signals in an interferometer by varying the source wavelength while acquiring the offset indicating signals. In contrast to prior art methods, the present invention provides a method that can be implemented for each or any optical path of an interferometer, without the need for additional special optical paths or controllable path length variations. Furthermore, systems and methods according to the present invention do not require any moving parts to adjust or control optical path lengths. However, for interferometer systems that already include such components, the systems and methods according to the present invention can still be used in place of or in addition to the other methods of offset correction methods available for such systems, to eliminate or compensate additional residual sources of offset error that cannot be eliminated by the other methods available for such systems.

As used herein, the term detector channel generally refers to a detector and the elements of its associated optical and electronic signal path(s) that are used to provide an interferometer measurement signal, such as a measurement signal approximately corresponding to the previously described signals $V_1$ or $V_2$, for example. In various exemplary embodiments, each pixel of a detector array corresponds to a separate detector channel and receives interference light corresponding a particular portion of a test object positioned in the object beam of the interferometer. In various exemplary embodiments, a plurality of pixels of one or more detector arrays correspond to a plurality of separate detector channels that receive interference light corresponding to the same particular portion of a test object, or nearly congruent particular portions of a test object, to provide a plurality of interferometer measurement signals that are combinable to provide an interpolated interferometer measurement corresponding to the (nearly congruent) particular portion(s).

The present invention provides a signal indicative of the offset contribution to a detector channel signal in an interferometer by varying the wavelength of radiation from the illumination source of the interferometer during the time that a corresponding signal is acquired or integrated by a detector of that detector channel. The method can be conveniently implemented with each detector channel of an interferometer, for a variety of interferometer designs. For example, it is common to employ CCD or CMOS cameras, or the like, as detectors that provide 2-dimensional interferograms in various phase shifting interferometers. In such cases, the systems and methods according to this invention can vary the wavelength of radiation from the illumination source while integrating the optical signal on each pixel of the camera. Accordingly, the offset signal contribution in every, or any, pixel of the camera can be determined. Furthermore, the method can be used to eliminate or compensate the offset error within a very short time period. For example, the time period may be much shorter than that required for making the mechanical adjustments that may be required to step through one or more discrete optical path length differences. Furthermore, it is not necessary to know or measure the wavelength during the integration time. In various exemplary embodiments, the wavelength should be varied at a rate which is relatively constant over a period of time corresponding to several periodic cycles of the optical signal presented to the detector, in order to provide the best estimate of the offset.

In accordance with one aspect of the invention, an illumination source is operated to provide a changing-wavelength illumination for the interferometer such that integrating the signal arising from the changing-wavelength illumination at least approximately corresponds to integrating a signal arising from a changing-wavelength illumination that changes continuously and monotonically during at least a portion of a signal integration period.

In accordance with further aspect of the invention, in various embodiments the duration of the signal integration period is on the order of milliseconds, or microseconds.

In accordance with a further aspect of the invention, in one embodiment, the changing-wavelength illumination is changed monotonically throughout the entire signal integration period.

In accordance with a further aspect of the invention, in one embodiment, the changing-wavelength illumination is changed at an approximately constant rate.

In accordance with another aspect of the invention, an interference light optical signal undergoes a number of phase variation cycles when the changing-wavelength illumination is changed and a signal arising in the detector in response to the interference light optical signal is integrated over a number of cycles of the interference light optical signal.

In accordance with a separate aspect of the invention, in one embodiment, the interferometer is operated such that the integration periods of various detector channels of the interferometer are substantially simultaneous when determining the signals usable to determine the offset correction for those various detector channels.

In accordance with a separate aspect of the invention, the interferometer is configured such that respective sets of at least first and second respective detector channels correspond to light from respective sets of at least first and second approximately congruent portions of a test object positioned in the object beam path; each respective set of approximately congruent portions corresponds to a respective nominal location on the test object; at least two of the respective interference light optical signals of each respective set have different respective relative phases; and for each respective set, integrated signals determined according to the principles of this invention are usable to determine at least one offset correction usable to correct interferometry measurement signals provided by the detector channels of that set, and the corrected interferometry measurement signals are combinable to provide an interpolated interferometer measurement corresponding to a respective nominal location on the test object that is relatively free of offset-induced errors.

In accordance with a further aspect of the invention, in one embodiment, for each respective set, the integrated signals are averaged to determine at least one offset correction usable to correct interferometry measurement signals provided by the detector channels of that set.

In accordance with a further aspect of the invention, in one embodiment the interferometer comprises at least one two-dimensional camera and each respective set of at least first and second respective detector channels has detectors that comprise pixels of the at least one two-dimensional camera, and a set of interpolated interferometer measurements corresponding to respective nominal locations on the test object are usable to provide a two-dimensional surface height profile of at least a portion of the test object, the two-dimensional surface height profile being relatively free of offset-induced errors.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A–6E illustrate an exploded view of a second exemplary embodiment of a multiple phase-shifted image generating portion, including second and third exemplary embodiments of a multiple phase-shift generating structure, all usable in various exemplary embodiments of the interferometer apparatus shown in FIG. 1;

DETAILED DESCRIPTION OF THE PREFERRED EMBODIMENT

Figure 1:
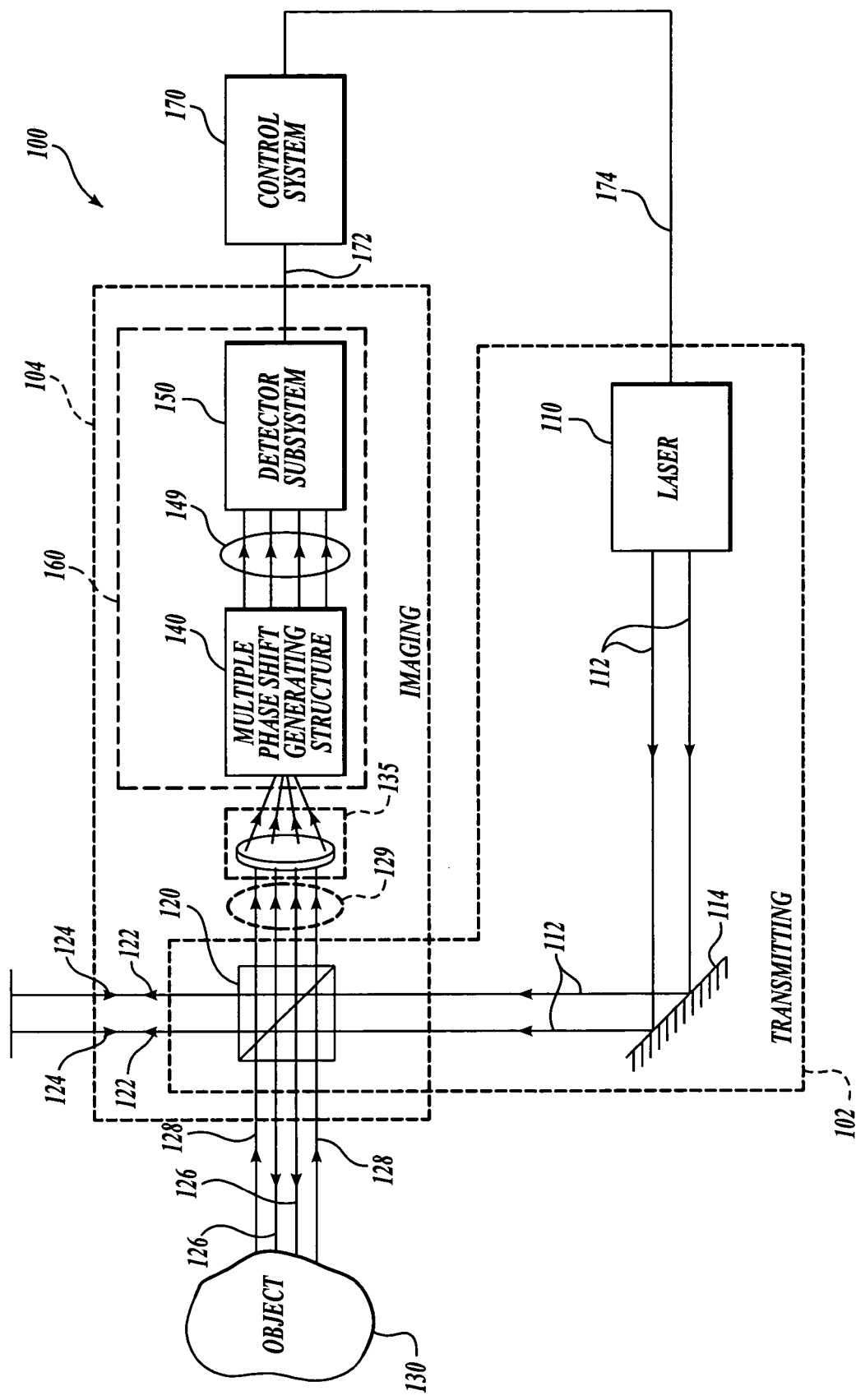
FIG. 1 is a block diagram illustrating a first generic embodiment of an interferometer system usable with various exemplary embodiments of the present invention.

FIG. 1 shows a first generic embodiment of an interferometer system 100, which is usable with various exemplary embodiments of the present invention. As shown in FIG. 1, the interferometer system 100 generally includes a transmitting portion 102 and an imaging portion 104. The transmitting portion 102 includes a laser source 110 that transmits a coherent light wavefront 112. As will be described in more detail below, in various exemplary embodiments according to the present invention the laser source 110 is tunable or otherwise able to provide a varying radiation frequency and illumination wavelength. In various exemplary embodiments, the laser source 110 may include wavelength modulation, or any other now known or later-developed device, structure or apparatus that can provide a varying wavelength of light over time, for the coherent light wavefront 112. As used herein, the term "light" encompasses not only visible light, but also any part of the electromagnetic spectrum that is otherwise usable according to the principles of this invention. In various exemplary embodiments, the laser source 110 is furthermore tunable or otherwise able to provide at least two precisely determined or measured wavelengths of light. When at least two such wavelengths of light are provided, the interferometer 100 may provide certain types of absolute measurement based on two wavelength or "two color interferometry" signal processing and measurement determining methods as generally known in the art and as outlined in the '330 patent and in U.S. application Ser. No. 10/270,130, "Improved Interferometer Using Integrated Imaging Array and High-Density Polarizer Array," and Ser. No. 10/282,110, "Improved Interferometer Using Integrated Imaging Array and High-Density Phase-Shifting Array," each of which is hereby incorporated herein by reference in their entirety. In any case, the coherent light wavefront 112 transmitted by the laser source 110 is redirected by a mirror 114 into a single polarizing wavefront splitter 120. The single polarizing wavefront splitter 120 both splits the coherent light wavefront 112 into a reference wavefront 122 sent to a reference mirror and an object wavefront 126 sent to an object 130, as well as combining the return reference wavefront 124 and the returning object wavefront 128 into a combined wavefront 129. The combined wavefront 129 then passes through an optical input portion 135.

As shown in FIG. 1, the imaging portion 104 of the exemplary embodiment of the interferometer 100 includes, in addition to the single polarizing wavefront splitter 120 and the optical input portion 135, a multiple phase-shift image generating portion 160. In various exemplary embodiments, the optical input portion 135 includes one or more optical elements such as lenses, apertures and the like, such that the combined wavefront 129 transmitted by the optical input portion 135 is compatible with the multiple phase-shift image generating portion 160. As shown in FIG. 1, the multiple phase-shift image generating portion 160 includes a multiple phase-shift generating structure 140 that inputs the combined wavefront 129 from the optical input portion 135 and outputs multiple phase-shifted interference image information 149 to a detector subsystem 150.

The detector subsystem 150 has, in general, one or more active surfaces that may be defined by one or more optical arrays. Each optical array may be a 2-dimensional pixel array and may be a video-imaging sensor, such as a charged coupled device (CCD) camera, or the like. The detector subsystem 150 inputs the multiple phase-shifted interference image information 149 and outputs the image data captured by the detector subsystem 150 over a signal and/or control line 172 to a control system 170. In various exemplary embodiments, the multiple phase-shifted interference image information 149 comprises at least two two-dimensional interferograms usable to determine a two-dimension height map of a corresponding portion of the surface of the object 130. In various exemplary embodiments according to this invention, the control system 170 may include various processors, circuits, routines and applications as necessary to perform any desired control operations, data storage, image processing and/or analyses on the captured image data, including providing offset corrections and offset-corrected measurement determinations for the object 130, and the like, according to the principles of this invention, as described further below. In various exemplary embodiments, the control system 170 provides various signals that control or synchronize the operations of the detector subsystem 150 with various other operations of the interferometer system 100. The control system 170 also outputs one or more control signals over the signal and/or control line 174 to drive the laser source 110 of the transmitting portion 102 in various exemplary embodiments according to this invention. It should be appreciated that in various exemplary embodiments, each of the signal and/or control lines 172 and 174 may include one or more individual signal connections, and/or signal and control busses or the like, as required to provide the required signal and control interfaces between the various components of the interferometer system 100.

Figure 2:
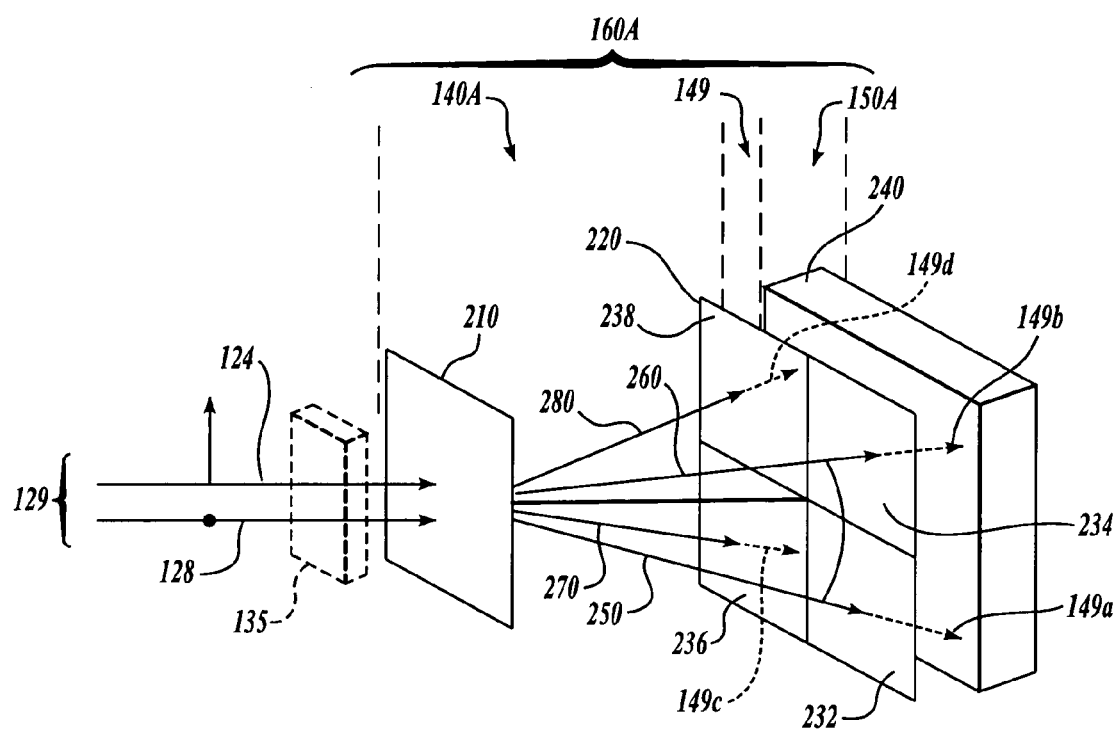
FIG. 2 illustrates a first exemplary embodiment of a multiple phase-shifted image generating portion disclosed in the '330 patent, including a first exemplary embodiment of a multiple phase-shift generating structure, all usable in various specific embodiments of the interferometer apparatus shown in FIG. 1.

FIG. 2 schematically shows a first exemplary embodiment of a multiple phase-shift image generating portion 160A substantially as disclosed in the incorporated '330 patent, which is usable in various specific embodiments of the interferometer system 100 shown in FIG. 1. The multiple phase-shifted-image generating portion 160A includes a wavefront splitting element 210 and a phase-shifting interference element 220 that are usable in combination to provide a known embodiment of the multiple phase-shift generating structure 140 previously described with reference to in FIG. 1. The multiple phase-shifted-image generating portion 160A also includes a detector array 240, which similarly provides a known embodiment of the detector subsystem 150.

As shown in FIG. 2, the combined wavefront 129 transmitted by the optical input portion 135 includes the reference wavefront 124 from the transmitting portion 102 and the object wavefront 128 returned or reflected by the object 130 through the polarizing wavefront splitter 120. The polarizing wavefront splitter 120 is configured so that the reference wavefront 124 and the object wavefront 128 are orthogonally polarized, which is indicated in FIG. 2 by the arrow and dot symbol convention applied to the wavefronts 124 and 128.

From the optical input portion 135, the combined wavefront 129 is directed onto the wavefront splitting element 210. As disclosed in the '330 patent, the wavefront splitting element 210 is a two-dimensional diffractive optical element (DOE), and is more particularly a holographic optical element (HOE). In any case, the wavefront splitting element 210 splits the combined wavefront 129 into four spatially separated and nominally congruent sub-wavefronts 250, 260, 270 and 280, which may, in various embodiments, be transmitted through an output lens (not shown). In particular, as disclosed in the '330 patent, each of the sub-wavefronts 250–280 follows a spatially discrete path. Each of the sub-wavefronts 250–280 is directed from the exemplary wavefront splitting element 210 to an exemplary phase-shifting interference element 220, which includes respective sections 232, 234, 236 and 238 for each of the sub-wavefronts 250-280, respectively.

In particular, as disclosed in the '330 patent, the phase-shifting interference element 220 is disposed with respect to the wavefront splitting element 210 so that the plurality of sub-wavefronts 250–280 are respectively incident on one of the plurality of sections 232–238. In particular, each of the sections 232–238 of the exemplary phase-shifting interference element 220 everywhere shifts the relative phase between the reference and object wavefronts 124 and 128 of that respective one of the sub-wavefronts 250–280 that is incident on that section 232–238 by a respective discrete phase shift $\Delta\phi_i$. The sections 232–238 of the exemplary phase-shifting interference element 220 then transmit the resulting wavefronts through respective polarizers to provide one known embodiment of the multiple phase-shifted interference image information 149 previously described with reference to FIG. 1.

In particular, each of the sections 232–238 of the phase-shifting interference element 220 thus transmits a complete respective one of the spatially separated phase-shifted interferograms 149a, 149b, 149c and 149d to the detector array 240. Within each respective one of the spatially separated phase-shifted interferograms 149a–149d the respective discrete phase shift $\Delta\phi_i$ is everywhere the same, and is out of phase with the phase shift of the other phase-shifted interferograms by a factor related to the various discrete phase shifts $\Delta\phi_i$.

As disclosed in the '330 patent, the detector array 240 may be a video-imaging sensor, such as a charged coupled device (CCD) camera. As disclosed in the '330 patent, the detector array 240 is disposed with respect to the phase-shifting interference element 220 so that the spatially separated plurality of phase-shifted interferograms 149a, 149b, 149c and 149d are substantially simultaneously incident on the active surface of the detector array 240. That is, the active surface of the detector array 240 is able to image the respective spatially separated phase-shifted interferograms 149a, 149b, 149c and 149d. Based on the imaged spatially separated phase-shifted interferograms 149a, 149b, 149c and 149d, the spatially resolved phase of each of the spatially separated phase-shifted interferograms 149a, 149b, 149c and 149d can be measured instantaneously in their different respective regions on the detector array 240.

Figure 3:
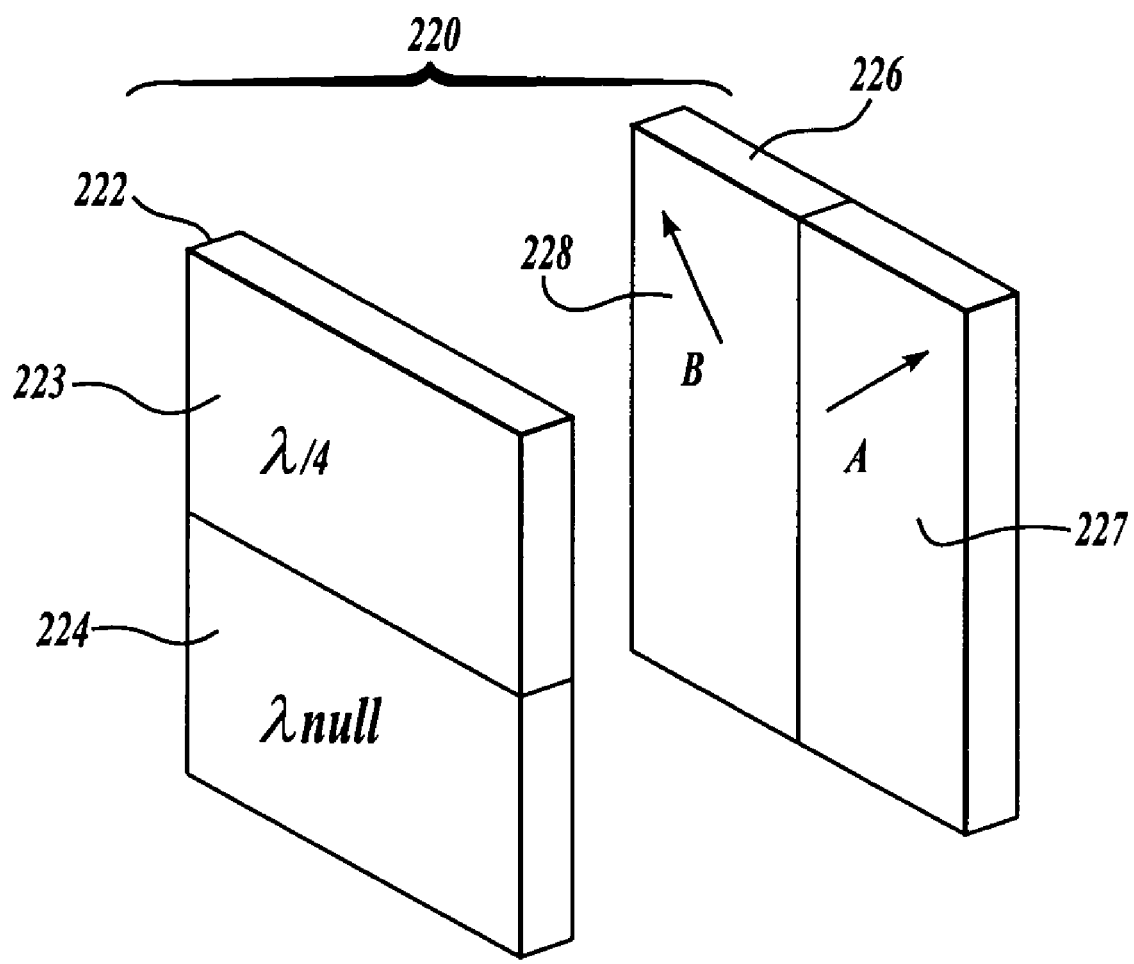
FIG. 3 illustrates in greater detail the phase-shifting element used the first exemplary embodiment of a multiple phase-shifted image generating portion disclosed in the '330 patent and shown in FIG. 2.

FIG. 3 shows one exemplary embodiment of the phase-shifting interference element 220 shown in FIG. 2, and disclosed in the '330 patent. As shown in FIG. 3, the phase-shifting interference element 220 includes a first plate 222 and a second plate 226. It should be appreciated that, in FIG. 3, the first and second plates 222 and 226 are shown spaced from each other for ease of illustration. However, in operation in the interferometer system 100, the first and second plates 222 and 226 would be placed adjacent to each other in an abutting relationship.

As shown in FIG. 3, the first plate 222 includes a quarter-wave plate 223 and a blank or neutral plate 224. In general, a quarter-wave plate shifts the relative phase of two orthogonally polarized incident wavefronts by 90°. In contrast, the blank or neutral plate shifts the relative phase of two orthogonally polarized incident wavefronts by 0°. That is, the blank or neutral plate 224 does not create any relative phase shift between the two orthogonally-polarized incident wavefronts. As shown in FIG. 3, the plates 223 and 224 are coplanar and divide the first plate 222 into respective halves.

The second plate 226 of the exemplary phase-shifting interference element 220 includes a pair of polarizing portions 227 and 228 that are configured to polarize an incident wavefront linearly so that electric field vectors of the transmitted wavefront are perpendicular with each other. In particular, in the exemplary embodiment shown in FIG. 3, one of the polarizing portions, such as, for example, the first polarizing portion 227, is configured to transmit polarized light at +45° with respect to the vertical axis, as illustrated by arrow A in FIG. 3. As a result, this causes the in-phase components arising from the reference and object wavefronts 124 and 128 to interfere.

Similarly, the other polarizing portion, such as, for example, the second polarizing portion 228, is configured to polarize light at −45° with respect to the vertical axis, as shown by arrow B. As a result, the out-of-phase components arising from the reference and object wavefronts 124 and 128 interfere. Like the quarter-wave and blank or neutral plates 223 and 224, the first and second polarizing portions 227 and 228 of the second plate 226 are also generally coplanar and divide the second plate 226 into respective halves.

Accordingly, it should be appreciated that, according to the structure shown in FIG. 3, the first portion 232 of the exemplary phase-shifting interference element 220 corresponds to the portion of the exemplary phase-shifting interference element 220 where the neutral plate 224 overlaps with the first (+45°) polarizing portion 227. Similarly, the second portion 234 corresponds to the quarter-wave plate 223 overlapping the first (+45°) polarizing portion 227. In contrast, the third portion 236 corresponds to the neutral plate 224 overlapping the second (−45°) polarizing portion 228, while the fourth portion 238 corresponds to the quarter-wave plate 223 overlapping the second (−45°) polarizing portion 228.

In particular, in the exemplary embodiment shown in FIG. 3, the first and second plates 222 and 226 are configured so that the respective portions 223 and 224 of the first plate 222 are perpendicular to the first and second polarizing portions 227 and 228 of the second plate 226.

Figure 4:
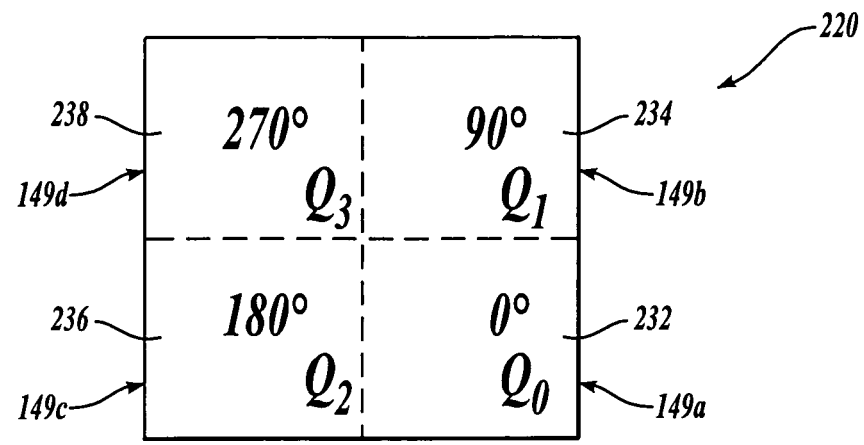
FIG. 4 illustrates the relative phase shift between the four portions of light generated using the first exemplary embodiment of a multiple phase-shifted image generating portion disclosed in the '330 patent and shown in FIG. 2.

As a result, in the exemplary embodiment of the phase-shifting interference element 220 shown in FIG. 3, and as represented in FIG. 4, in the first portion 232, the neutral plate 224 and the first (+45°) polarizing portion 227 interfere the in-phase component, that is, the 0° component between the reference and object wavefronts 124 and 128 incident on the phase-shifting interference element 220, to generate the interferogram 149a. In contrast, in the second portion 234, the quarter-wave plate 223 and the first (+45°) polarizing portion 227 combine to interfere the in-phase quadrature component, that is, the 90° component, between the incident reference and object wavefronts 124 and 128, to generate the interferogram 149b. In contrast to both the first and second portions 232 and 234, for the third portion 236, the neutral plate 224 and the second (−45°) polarizing portion 228 combine to interfere the out-of-phase component, that is, the 180° component, between the incident reference and object wavefronts 124 and 128, to generate the interferogram 149c. Finally, for the fourth portion 238, the quarter-wave plate 223 and the second (−45°) polarizing portion 228 combine to interfere the out-of-phase quadrature component, i.e., the 270° component, between the reference and object wavefronts 124 and 128, to generate the interferogram 149d.

Figure 5:
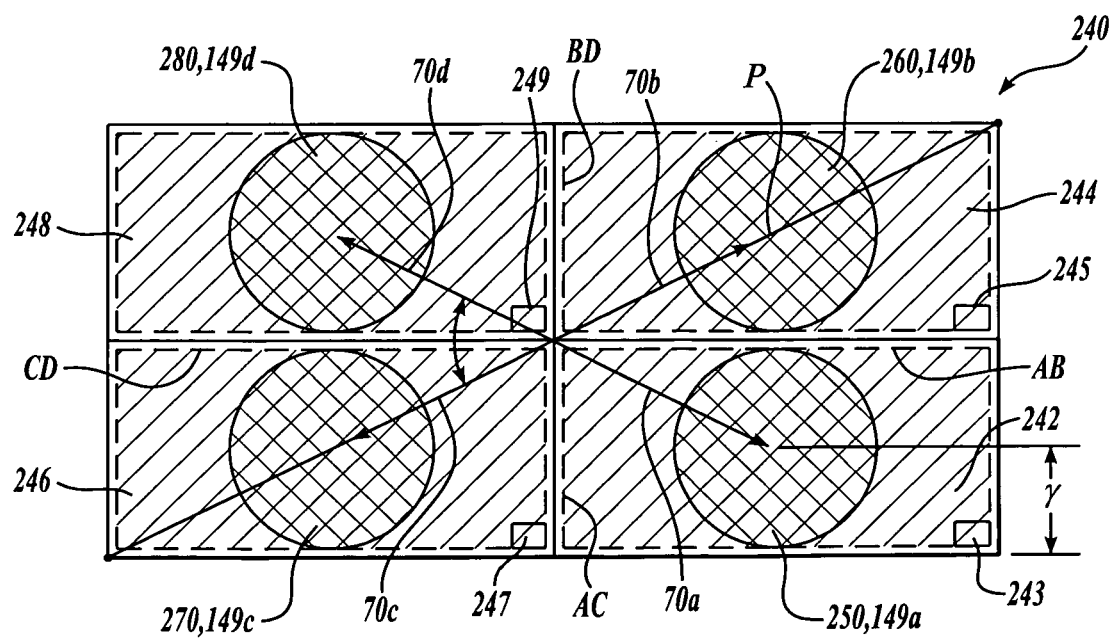
FIG. 5 illustrates how the four portions of light are distributed over an imaging array when using the first exemplary embodiment of a multiple phase-shifted image generating portion disclosed in the '330 patent and shown in FIGS. 2–4.

As shown in FIG. 5, the detector array 240 can be considered to have distinct portions 242, 244, 246 and 248 in which each of the sub-wavefronts 250, 260, 270 and 280, respectively, are nominally congruently imaged, as the phase-shifted interferograms 149a, 149b, 149c and 149d, having respective induced phase shifts of 0, 90, 180 and 270 degrees.

Each of these interferograms may be characterized in terms of the previously discussed EQUATIONS 4 and 5. Interferogram 149b having a respective induced phase shifts of 90 degrees can be taken to corresponds to EQUATION 4. Interferogram 149a having respective induced phase shifts of 0 degrees, that is, having a phase shift that lags behind that of interferogram 149b by 90 degrees, can be taken to correspond to EQUATION 5. Furthermore, since the multiple phase-shift image generating portion 160A splits a single combined wavefront into the four phase-shifted interferograms 149a, 149b, 149c and 149d, and images each of the interferograms onto the same imaging array, it will be appreciated that due to similarity of the respective optical path elements and the similar pixel characteristics throughout the shared detector, to a first approximation, each of the signals will have nominally the same AC amplitude and will include nominally the same common mode offset contribution. Thus, the multiple phase-shift image generating portion 160A provides one known method of providing interferometer signals that include various offset signal contributions as common mode errors, as previously described. In particular, to a first approximation, the interferogram 149d having a respective induced phase shift of 270 degrees, that is, having a 180 degree phase shift with respect to the interferogram 149b, can be taken to correspond to:

$$V'_1 = C_1 - A_1 \sin\frac{2\pi}{\lambda}z \qquad (\text{Eq. 6})$$

Similarly the interferogram 149c having a respective induced phase shift of 180 degrees, that is, having a 180 degree phase shift with respect to the interferogram 149a, can be taken to correspond to:

$$V'_2 = C_2 - A_2 \cos\frac{2\pi}{\lambda}z \qquad (\text{Eq. 7})$$

Accordingly, the following equation, which is comparable to EQUATION 3, provides a known method of eliminating the effect of the common mode offset errors and providing an interpolated value for z, within a particular wavelength:

$$z = \frac{\lambda}{2\pi}\tan^{-1}\frac{(V_1 - V'_1)}{(V_2 - V'_2)}. \qquad (\text{Eq. 8})$$

As outlined above, the known multiple phase-shifted-image generating portion 160A converts a number of errors in other interferometers that are not common-mode errors, including various offset errors, into common-mode errors when used in the interferometer system 100. However, various error sources remain. For example, any rotations and/or translations that do not affect the paths of the sub-wavefronts 250, 260, 270 and 280 equally will cause the path lengths of these paths to vary. In general, this will cause different focus conditions in the associated spatially separated phase-shifted interferograms 149a, 149b, 149c and 149d, and/or may cause a shift in the relative locations of the various portions spatially separated phase-shifted interferograms 149a, 149b, 149c and 149d upon the detector, which can lead to errors. For example, for the given pixel 243 in the first portion 242, as shown in FIG. 5, the correspondingly located pixels 245, 247 and/or 249 in the second-fourth portions 244–248, respectively, may no longer correspond to precisely the same portion of the object 130 and, thus, may no longer be properly comparable or properly combinable in EQUATION 8. In addition, it is difficult and/or expensive to make the multiple phase-shifted-image generating portion 160A, including the wavefront-splitting element 210 that provides the functions described with reference to FIGS. 2–5, without introducing various aberrations that vary between the comparable regions of the spatially separated phase-shifted interferograms 149a, 149b, 149c and 149d. These factors in turn introduce sources of error into the measurement values generated by the control system 170 from the image data output over the signal line 172 from the detector array 240.

Furthermore, as is well known in the art, for semiconductor imaging devices, such as CCD arrays and CMOS-based arrays, any two adjacent pixels will likely have nearly the same bias or offset characteristics and the same response curve or transfer function between an input intensity and an output signal amplitude. However, as is well known in the art, for such semiconductor imaging devices, pixels significantly spaced apart within the array, such as the pixels 243, 245, 247, and 249, can have significantly different bias or offset characteristics and/or response curves, in relation to the desired levels of interpolation and accuracy for many modern interferometer systems.

It should be appreciated that such differences in the bias and offset errors that arise at the pixel level, and in subsequent pixel-related signal processing in the detector 240 and/or the control system 170, are not removed by the common mode error rejection provided by EQUATION 8 used in conjunction with the signals provide by the multiple phase-shifted-image generating portion 160A. However, as previously mentioned, the systems and methods of the present invention as described in detail below, can be conveniently implemented with each signal detection channel of an interferometer, for a variety of interferometer designs. For example, with regard to the multiple phase-shifted-image generating portion 160A, the systems and methods according to this invention can be used to vary the wavelength of radiation from the illumination source while integrating the optical signal on each pixel of the detector 240. Accordingly, using one of the systems and methods according to the present invention, the offset signal contribution specific to each individual pixel of the detector 240 can be determined and the various interferometry signals provided through each individual pixel can have the determined offset signal contribution eliminated or compensated in subsequent processing, in order to provide improved levels of interpolation and accuracy for the interpolation system 100 when using the known multiple phase-shifted-image generating portion 160A. It should be appreciated that various conventional CCD or CMOS camera detectors inherently provide a suitable integration period that accumulates the charge induced in each pixel by the accumulated radiation exposure, during each conventional image acquisition cycle of such cameras.

It should be appreciated that the various errors and difficulties described above with reference to the elements and operations shown in FIGS. 2–5 exemplify similar errors and difficulties that may arise in any interferometer system to the extent that a multiple phase-shift generating structure 140 and the multiple phase-shifted interference image information 149 distribute spatially separated wavefronts, that is, spatially separated phase-shifted interferograms, into separate portions or surfaces of a detector subsystem 150. It should be appreciated that in comparison to the elements and operations shown in FIGS. 2–5, the magnitude of such error and difficulties are relatively aggravated in interferometer systems that use additional optical elements and/or different cameras to provide different optical paths for acquiring a plurality of interferograms, or the like. Accordingly, the systems and methods according to the present invention can provide even greater relative benefit when applied to such systems.

FIG. 6 illustrates a second exemplary embodiment of a multiple phase-shifted image generating portion 160B, usable in conjunction with the systems and methods according to this invention in various specific embodiments of the interferometer apparatus shown in FIG. 1. In the multiple phase-shifted image generating portion 160B, various sources of non-common-mode errors and other errors present in the multiple phase-shifted image generating portion 160A can be further reduced, and ideally eliminated, to the extent that multiple phase-shifted interference image information can be provided for multiple phases within a small region on the detector subsystem 150. This is in contrast to distributing each of the sub-wavefronts 250, 260, 270 and 280, and thus the respective distinct spatially separated phase-shifted interferograms 149a, 149b, 149c and 149d into separate portions of the detector array 240, which embodies the detector subsystem 150, over independent optical paths.

Stated another way, if the multiple phase-shifted interference image information produced by the combination of the spatially separated phase-shifted interferograms 149a, 149b, 149c and 149d can be retained, while modifying or eliminating the wavefront splitting element 210, such that at least some of the optical paths for at least some of the phases included in the multiple phase-shifted interference image information were no longer spaced apart over the quadrants $Q_0$–$Q_3$ and the surface of the detector subsystem 150, certain additional non-common-mode error sources can either be eliminated and/or converted into common-mode errors in the measurements generated by the control system 170 from the images output by the detector subsystem 150 over the signal line 172.

FIG. 6 is an exploded view illustrating a second exemplary embodiment of a multiple phase-shifted image generating portion 160B. The fabrication, assembly and operation of the various elements shown in FIG. 6 are disclosed and described in detail in the incorporated '130 and '110 applications. Therefore, only certain aspects of the fabrication and operation of the multiple phase-shifted image generating portion 160B are described below, to illustrate certain features and benefits that can be used in combination with the systems and methods of the present invention, which are explained further below with reference to FIGS. 7–14. It should be appreciated that the second exemplary embodiment of a multiple phase-shifted image generating portion 160B is usable in place of the multiple phase-shift image generating portion 160A shown in FIGS. 2–5 and, more generally, as the multiple phase-shift image generating portion 160 described with reference to FIG. 1.

As shown in FIG. 6A, the multiple phase-shifted image generating portion 160B includes a multiple phase-shift generating structure 140B and detector subsystem 150B. In various exemplary embodiments, a single array detector 710 of any suitable known or later-developed type is used to implement the detector subsystem 150B. As shown in FIG. 6, in various specific embodiments, the multiple phase-shift generating structure 140B incorporates various combinations of a specific high-density phase-shifting array element 490 as disclosed in the incorporated '110 application and further below and polarizer element 530, which in various specific embodiments is a high-density polarizer array as described in the incorporated '110 and '130 applications and further below, and in various other specific embodiments usable in combination with the systems and methods according to the present invention is a uniform polarizing element providing a single direction of polarization.

As shown in FIG. 6A, the combined wavefront 129, previously described with reference to FIGS. 1 and 2, is transmitted by the optical input portion 135'. The transmitted combined wavefront 129 includes the previously described reference wavefront 124 and the object wavefront 128. The transmitted combined wavefront 129 propagates as a single wavefront that fills the high-density phase-shifting array element 490, which provides the combined functions of two interleaved retarder plates having a quarter-wave retardation difference between them, as described in detail in the incorporated '110 Application and further below. Thus, in various exemplary embodiments, the transmitted combined wavefront 129 that propagates from the high-density phase-shifting array element 490 includes an interleaved pattern of at least two phase-shift portions having different relative phase-shifts that are separated by 90 degrees of relative phase shift.

The transmitted combined wavefront 129 passing out of the high-density phase-shifting array element 490, including the interleaved pattern of 90-degree-different relative phase-shifts, is directed onto the polarizer element 530, which generally speaking operates to transmit and interfere various in-phase and/or out-of-phase components of the orthogonally polarized components 124 and 128 in various portions of the transmitted combined wavefront 129 passing out of the high-density phase-shifting array element 490, as described in detail in the incorporated '110 and '130 applications and further below.

As a result, a 2-dimensionally interleaved pattern of interference portions is produced in the multiple phase-shifted interference image information 640 that passes out of the polarizer element 530. This 2-dimensionally interleaved pattern of interference portions is received as a single image that extends substantially over the entire surface area of the detector device 710 that is used to implement the detector subsystem 150B. It should be appreciated that in various exemplary embodiments, the 2-dimensionally interleaved pattern of interference portions can include first, second, third and fourth relative-phase interference portions in the multiple phase-shifted interference image information 640, the first-fourth relative-phase interference portions functionally corresponding to a high-density, that is, pixel-by-pixel, interleaving of the $Q_0$–$Q_3$ quadrants 232–238, shown in FIG. 4, transmitted as a single image onto the surface of the detector device 710 that is used to implement the detector subsystem 150B.

In a first exemplary embodiment of the multiple phase-shifted image generating portion 160B shown in FIG. 6, the reference wavefront 124 and the object wavefront 128 are polarized along the orthogonal directions 132A and 133A shown in FIG. 6A. In this first exemplary embodiment, the polarizer element 530 includes a high-density polarizer array including pattern 531A shown in FIG. 6C, which includes the strip-like first polarizing portions 532A and the strip-like second polarizing portions 534A, having respective polarization directions as indicated by the respective "grid lines" in the detailed view of the pattern 531A.

In this exemplary embodiment, when the polarizer element 530 includes a high-density polarizer array having the pattern 531A, the high-density phase-shifting array element 490 includes a pattern 491A. The pattern 491A, as shown in the detailed view shown in FIG. 6B, includes alternatingly-arranged strip-like zero-degree phase-shift portions $P_0$ and strip-like 90-degree phase-shift portions $P_{90}$. In various exemplary embodiments, the strip-like zero-degree phase-shift portions $P_0$ and strip-like 90-degree phase-shift portions $P_{90}$ of the high-density phase-shifting array element 490 are fabricated by forming the appropriate thickness in a birefringent material layer or a birefringent substrate according to any of the methods described in the incorporated '110 Application. However, it should be appreciated that, in this particular exemplary embodiment, the fast axis direction of the birefringent material layer or a birefringent substrate is everywhere uniformly vertical, as in the embodiment shown in FIG. 15 of the incorporated '110 application.

In this exemplary embodiment, it should be appreciated that the first polarization portions 532A function to transmit and interfere the in-phase components of the orthogonally polarized components 124 and 128 in the transmitted combined wavefront 129 passing out of the high-density phase-shifting array element 490. Similarly, the second polarization portions 534A function to transmit and interfere the out-of-phase components of the orthogonally polarized components 124 and 128 in the transmitted combined wavefront 129 passing out of the high-density phase-shifting array element 490. The structure of the multiple phase-shifted interference image information 640 corresponding to this exemplary embodiment is structured in a "checkerboard-like" structure of differently phase-shifted "cells" or portions functionally corresponding to a high-density, interleaving of the $Q_0$–$Q_3$ quadrants 232–238, shown in FIG. 4, in a structure corresponding to the following matrix:

$$\begin{matrix} Q_3 & Q_1 & Q_3 & Q_1 \\ Q_2 & Q_0 & Q_2 & Q_0 \\ Q_3 & Q_1 & Q_3 & Q_1 \\ Q_2 & Q_0 & Q_2 & Q_0 \end{matrix}$$

Each $Q_3$ cell or portion is created where a phase-shift portions $P_{90}$ overlaps a −45 degree polarized second polarization portion 534A. Each $Q_1$ cell or portion is created where a phase-shift portion $P_{90}$ overlaps a +45 degree polarized first polarization portion 532A. Each $Q_2$ cell or portion is created where a phase-shift portions $P_0$ overlaps a −45 degree polarized second polarization portion 534A. Each $Q_4$ cell or portion is created where a phase-shift portion $P_0$ overlaps a +45 degree polarized first polarization portion 532A. In various exemplary embodiments, each cell or portion corresponds to a single pixel of the detector device 710 that is used to implement the detector subsystem 150B.

In this exemplary embodiment, the various portions the multiple phase-shifted interference image information 640 can be signal processed as described with reference to FIG. 20 of the incorporated '110 Application, which roughly corresponds to an implementation of EQUATION 8, but using adjacent pixels, that are more likely to have more similar common mode errors, for improved accuracy relative to an interferometer system using widely separated pixels as provided in the multiple phase-shifted-image generating portion 160A.

However, similar to the previous discussion with reference to the multiple phase-shifted-image generating portion 160A, it should be appreciated that there may still be residual differences in the bias and offset errors that arise at the pixel level, and in subsequent pixel-related signal processing in the detector 710 and/or the control system 170, that are not removed by the common mode error rejection provided by the multiple phase-shifted-image generating portion 160B. However, as previously mentioned, the systems and methods of the present invention as described in detail below, can be conveniently implemented with each signal detection channel of an interferometer, for a variety of interferometer designs. For example, with regard to the multiple phase-shifted-image generating portion 160B, the systems and methods according to this invention can be used to vary the wavelength of radiation from the illumination source while integrating the optical signal on each pixel of the detector 710. Accordingly, using one of the systems and methods according to the present invention, the offset signal contribution specific to each individual pixel of the detector 240 can be determined and the various interferometry signals provided through each individual pixel can have the determined offset signal contribution eliminated or compensated in subsequent processing, in order to provide improved levels of interpolation and accuracy for the interpolation system 100 when using the multiple phase-shifted-image generating portion 160B.

Alternatively, in various exemplary embodiments, the systems and methods according to the present invention are used simply to provide an alternative method of error reduction and/or signal processing that may provide various advantages in certain applications or with certain economical interferometer system components.

In a second exemplary embodiment of the multiple phase-shifted-image generating portion 160B, the systems and methods according to the present invention allow a simplification of at least one component of the a multiple phase-shift generating structure 140B. This second exemplary embodiment is not specifically disclosed in the incorporated '110 and '130 applications. However, the fabrication, assembly and operation of the various components described below will be clear based on the various teachings included therein.

In this second exemplary embodiment of the of the multiple phase-shifted-image generating portion 160B, the reference wavefront 124 and the object wavefront 128 are polarized along the orthogonal directions 132B and 133B shown in FIG. 6. In this second exemplary embodiment, the polarizer element 530 is a uniform polarizing element providing a single direction of polarization as indicated by the respective "grid lines" 532B in the detailed view of pattern 531B. In various exemplary embodiments, the uniform polarizer element 530 is implemented using a wire grid polarizing element formed by an array of parallel conductive elements separated by spaces. U.S. Pat. Nos. 6,108,131; 6,122,103; and 6,243,199, each incorporated herein by reference for their relevant teachings, disclose systems and methods for forming such wire grid polarizing elements.

In this exemplary embodiment, when the polarizer element 530 includes the polarization direction shown 531B, the high-density phase-shifting array element 490 includes a pattern 491B. The pattern 491B, as shown in the detailed view of FIG. 6D, includes a checkerboard pattern of zero-degree phase-shift portions $P_0$ and 90-degree phase-shift portions $P_{90}$. In various exemplary embodiments, the checkerboard pattern of zero-degree phase-shift portions $P_0$ and 90-degree phase-shift portions $P_{90}$ of the high-density phase-shifting array element 490 are fabricated by forming the appropriate thickness in a birefringent material layer or a birefringent substrate according to any of the methods described in the incorporated '110 application. In this particular exemplary embodiment, the fast axis direction of the birefringent material layer or a birefringent substrate is everywhere uniformly vertical, as in the embodiments shown in FIGS. 6 and 15 of the incorporated '110 application.

In this exemplary embodiment, it should be appreciated that the polarizer element 530 functions to transmit and interfere the in-phase components of the orthogonally polarized components 124 and 128 in the transmitted combined wavefront 129 passing out of the high-density phase-shifting array element 490. The structure of the multiple phase-shifted interference image information 640 corresponding to this exemplary embodiment is structured in a "checkerboard-like" structure of differently phase-shifted "cells" or portions functionally corresponding to a high-density, interleaving of only the $Q_0$ and $Q_1$ quadrants 232 and 234, shown in FIG. 4, in a structure corresponding to the following matrix:

$$Q_0 \quad Q_1 \quad Q_0 \quad Q_1$$
$$Q_1 \quad Q_0 \quad Q_1 \quad Q_0$$
$$Q_0 \quad Q_1 \quad Q_0 \quad Q_1$$
$$Q_1 \quad Q_0 \quad Q_1 \quad Q_0$$

Each $Q_0$ cell or portion is created by a phase-shift portions $P_0$ overlaps the horizontal polarizing element 530. Each $Q_1$ cell or portion is created where a phase-shift portion $P_{90}$ overlaps the horizontal polarizing element 530. In various exemplary embodiments, each cell or portion corresponds to a single pixel of the detector device 710 that is used to implement the detector subsystem 150B.

In contrast to the previously described embodiments of the multiple phase-shifted-image generating portion 160A and the first exemplary embodiment of the multiple phase-shifted-image generating portion 160B, this second exemplary embodiment of the multiple phase-shifted-image generating portion 160B is structurally simpler, but it provides interleaved phase-shifted image portions corresponding to only two different phase-shifts, of 0 and 90 degrees, respectively. Thus, there are no portions providing 180 degrees of relative phase-shift in comparison to these portions, and the approach for eliminating common mode offset errors that was previously described in relation to EQUATIONS 6–8 cannot be applied. However, it should be appreciated that the systems and methods according to the present invention, as described further below with reference to FIGS. 7–14, can still be applied to eliminate offset errors in a two-phase embodiment of the interferometer system 100, for example when this embodiment of the multiple phase-shifted-image generating portion 160B is used to provide a two-phase embodiment of the interferometer system 100, without the need for providing additional optical paths or additional optical path length altering elements in the interferometer system 100.

More generally, it should be appreciated that the systems and methods according to the present invention can be combined with a wide variety of two-phase, three-phase, four-phase of the interferometer systems, including, but not limited to any embodiment in the incorporated '110 and '130 Applications, to provide various benefits as outlined above. Thus, the foregoing interferometer system embodiments that are usable in combination with the systems and methods according to the present invention, including the particular multiple phase shift generating structures of such systems, are intended to be exemplary only, and not limiting.

Referring now to the problem of eliminating and/or compensating various offset errors in interferometer systems, which is the primary object of the systems and methods according to this invention, as previously outlined, a primary disadvantage of a number of prior art solutions is that they require moving parts and/or added system complexity and cost specifically to provide additional optical signal paths and/or adjusted optical signal path lengths that are usable to provide the additional signals necessary for eliminating and/or compensating at least some of the offset error contributions. For example, the previously described 4-phase interferometer systems described with reference to FIGS. 2–6C, that apply signal processing approximately functionally equivalent to EQUATION 8, require specialized, precise, and complex elements such as diffractive optical elements or high density polarizer arrays, or the like. In addition, such systems essentially require that four differently phase-shifted interferograms share the area of a single detector, which reduces the effective measurement spatial resolution or measurement density that can be provided for the test object 130 in comparison to systems where only two differently phase-shifted interferograms share the area of a single detector.

Other systems are known that apply signal processing approximately functionally equivalent to EQUATION 8, and that use two cameras to provide four differently phase-shifted interferograms, or the equivalent image information, and yet other systems use three or four cameras for this purpose. Such systems avoid some of the aforementioned disadvantages but compound other disadvantages. Several two camera configurations are disclosed in the incorporated '110 and '130 Applications. A four camera configuration, including yet another exemplary multiple phase shift structure that is usable according to the principles of this invention, is described in the article "Instantaneous Phase Measuring Interferometry", by R. Smythe and R. Moore, in Optical Engineering, July/August 1984, Vol. 23 No. 4, pages 361–364, which is hereby incorporated herein by reference in its entirety.

In yet other known methods for eliminating or compensating offset signal contributions, a tunable laser source interferometer is stepped in N discrete frequency or wavelength steps and each of the related interferometry signals are acquired and stored by the interferometer system. In various embodiments, the N discrete frequency or wavelength steps are precisely controlled and known, adding system complexity and reducing the speed of execution of the required signal acquisition, which is a disadvantage of such methods. In various other embodiments, the frequency or wavelength steps are not precisely controlled, which relatively speeds up the execution of the required signal acquisition, but introduces additional complications into the subsequent signal processing to determine the offset signal contribution, which is a disadvantage of such methods. In various exemplary embodiments, a variety of known algorithms are used for analyzing the acquired signals to determined the offset signal components, including the Heydeman algorithm, Fourier analysis, or the like.

It should be appreciated that a further disadvantage of virtually all of the aforementioned techniques is that they are compromised by inevitable external vibrations, which alter the various optical path lengths of the various prior art systems and methods over the elapsed time taken to acquire the signal measurements necessary for offset signal compensation. Thus, the vibrations alter various signals and signal relationships in an uncontrolled manner and lead to corresponding errors in the associated offset signal compensation.

In contrast to the foregoing known systems and methods, the present invention utilizes a unique implementation of a method for measuring the signal offset by varying the source wavelength $\lambda$, thus making it possible to acquire the signals necessary to eliminate and/or compensate various offset errors through standard detector signal channels of the interferometer system, without the necessity of added components or extraneous optical path length adjustments in the standard optical paths of an interferometer system. The present invention is also particularly advantageous because it continuously sweeps the source wavelength $\lambda$, and can therefore provide the signals necessary to eliminate and/or compensate various offset errors in a very short time. It should be appreciated that providing the necessary signals in a very short time relatively reduces the sensitivity of the method to the aforementioned inevitable vibrations. Furthermore, due to developments associated with the optical telecommunications industry, tunable wavelength sources suitable for varying the source wavelength $\lambda$ are increasingly available with increased precision and speed, and at decreasing costs.

It is convenient in the following discussions to refer to the quantity $(z/\lambda)$ as the optical phase. As previously summarized, the present invention provides a signal indicative of the offset contribution to a detector channel signal in an interferometer by varying the wavelength of radiation from the illumination source of the interferometer during the time that the signal is acquired or integrated by the detector of that detector channel. The purpose of the wavelength variation is outlined as follows. The EQUATIONS 4 and 5, for example, illustrate how the signals in various detector channels of an interferometer generally depend on an offset C, the OPD z, and the source wavelength $\lambda$. Since the object of this invention is to determine an offset component associated with any detector channel, we must assume for this discussion that the offset component C is unknown. It should be appreciated that, when different detector channels correspond to different portions of an irregular test object, the different portions of the object will generally have a different OPD z, and the OPD z is generally the "unknown" to be determined for each portion of the test object. Accordingly, for each portion of the test object, and each detector channel, the optical phase $(z/\lambda)$ is also unknown. Thus, EQUATION 4, for example, cannot be solved for the offset $C_1$, even if $A_1$ and $\lambda$ are known.

However, it should be appreciated that for typical values of the OPD z and the wavelength $\lambda$, and when the OPD z is fixed, the quantity $A_1 \text{Sin } 2\pi(z/\lambda)$ in EQUATION 4 is a rapidly changing periodic function for small changes in the value of the wavelength $\lambda$. Furthermore, when the integral of this periodic function is taken and averaged over many periods, even a non-integer number of periods, the resulting average will tend to converge to approximately zero, regardless of the value of $A_1$, regardless of the value of z, and regardless of the precise nominal value or range for the wavelength $\lambda$. Accordingly, in terms of operating the interferometer, if the wavelength $\lambda$ is varied properly, the optical phase of the optical input to the detector will vary properly, and when the resulting detector response is integrated and the resulted averaged over the integration time, the corresponding component in EQUATION 4 or EQUATION 5, or the like, will be approximately zero, and the integrated and time averaged signal that remains will be the offset component that we desire to determine, the offset $C_1$ (or $C_2$), or the like.

These conditions are conveniently, economically and nearly ideally fulfilled by varying the wavelength continuously and monotonically over a significant range in various exemplary embodiments according to this invention. However, it should be appreciated that this invention is not so limited. More generally, the wavelength may be varied in a variety of different ways during the integration period, including ways that do not result in an uninterrupted and "unidirectional" optical phase change for the detector input, and a comparable or usable result can still be obtained. Various alternatives are outlined further below. However, it should be appreciated that in such cases it is generally desirable not to linger at one wavelength longer than another wavelength in a way that will bias the integrated signal. Furthermore, it is generally desirable to provide wavelengths that cause the quantity Sin $2\pi(z/\lambda)$ to vary throughout the full range of obtainable values, to further avoid introducing a bias into the integrated signal. In various exemplary embodiments, such generally desirable conditions may be at least approximately or sufficiently fulfilled without the costly elements and mechanisms that deliver precisely controlled optical path length variations, or precisely controlled wavelength variations, that are used in various conventional systems and methods to change an optical phase by a precisely known or controlled amount. In various exemplary embodiments according to this invention, it is one object of this invention to avoid such costly and/or slow elements and mechanisms. In various other exemplary embodiments according to this invention, where these elements are preexisting in an interferometer, it is one object of this invention to supplement the use of such elements with the additional benefits of this invention, or to provide a faster alternative method for determining offsets in such interferometers.

It should also be appreciated that although the previous description, and descriptions further below, generally describe the offset component that we desire to determine for a detector channel as being the time-averaged integrated signal, or the equivalent, in a wide variety of applications the time averaging operation can be avoided by making the total effective integration period of the offset correction determining operations according to this invention the same as the total effective integration period for the various interferometry measurements that are to be offset corrected or compensated using the determined offset correction. According to this procedure, the total integrated offset component will be the same in each case. Thus, the total integrated detector signal value from the offset correction determining operations can be directly subtracted from the total integrated interferometry measurement value, for example, to provide the desired offset-corrected interferometry measurement signal.

In general, the offset value for each signal detector of an interferometer, for example, each pixel of a camera used as an interferogram detector, will be different, and therefore the offset signals should be determined and removed on a per-detector or per-pixel basis. The present invention can be conveniently implemented with each signal detection channel of an interferometer, for a variety of interferometer designs. For example, the systems and methods according to this invention can vary the wavelength of radiation from the illumination source while integrating the optical signal on each pixel of a camera used in an interferometer system. This makes the present invention particularly valuable when used in combination with various multi-path multi-camera interferometer systems such as those disclosed in the incorporated references. It should be appreciated that various contributions to the offset errors associated with such multi-path multi-camera systems are not common mode errors, and therefore cannot be removed by the majority of the previously discussed prior art methods. In contrast, the present invention is fully effective with such multi-path multi-camera interferometer systems.

The present invention is now described in greater detail with reference to FIGS. 7–14.

Figure 7:
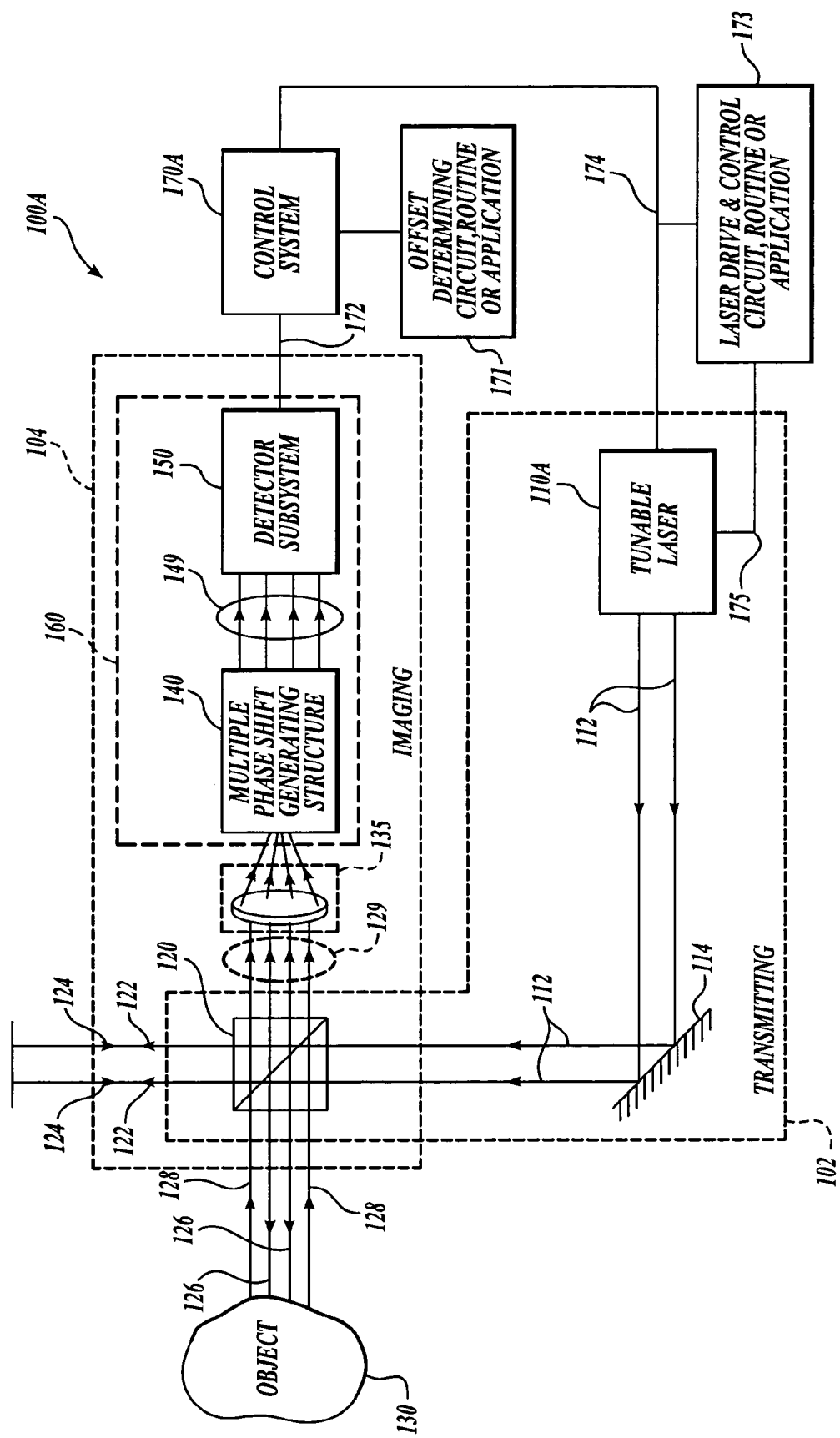
FIG. 7 is a block diagram illustrating a further exemplary embodiment of the generic interferometer system shown in FIG. 1, which explicitly includes an offset determining circuit, routine or application in accordance with the present invention.

FIG. 7 is a block diagram illustrating the interferometer system 100A, which is a further exemplary embodiment of the generic interferometer system 100 shown in FIG. 1 that explicitly includes an offset determining circuit, routine or application 171 and a tunable laser 110A in accordance with the present invention. FIG. 7 also shows a laser drive and control circuit, routine or application 173, which is element that is optional or omitted in various exemplary embodiments of the interferometer system 100A, as described further below. In various embodiments, the laser drive and control circuit, routine or application 173 is interconnected with the control system 170A and the tunable laser 10A by the signal and/or control lines 174 and 175, respectively. In various other exemplary embodiments, the elements of the laser drive and control circuit, routine or application 173 are included in, and indistinguishable from, the control system 170A and the tunable laser 110A. Otherwise, the other elements of the interferometer system 100A may comprise any of their embodiments previously described with reference to the interferometer system 100, as well as a variety of alternative embodiments that are generally known or will be apparent to one of ordinary skill in the art. The tunable laser 110A and the laser drive and control circuit, routine or application 173 are discussed further below with reference to FIG. 12.

In the embodiment shown in FIG. 7, the offset determining circuit, routine or application 171 is implemented as a portion of the control system 170A. However, it should be appreciated that in various other exemplary embodiments, the offset determining circuit, routine or application 171 may be implemented as a separate circuit, routine or application that interfaces with the control system 170A and/or other components of the interferometer system 100A over one or more of the signal and/or control lines 172 and 174, or similar separate signal and/or control lines. In various exemplary embodiments, the offset determining circuit, routine or application 171 is operable to implement the operations of systems and methods according to this invention that are described with reference to FIGS. 8–14.

Figure 8:
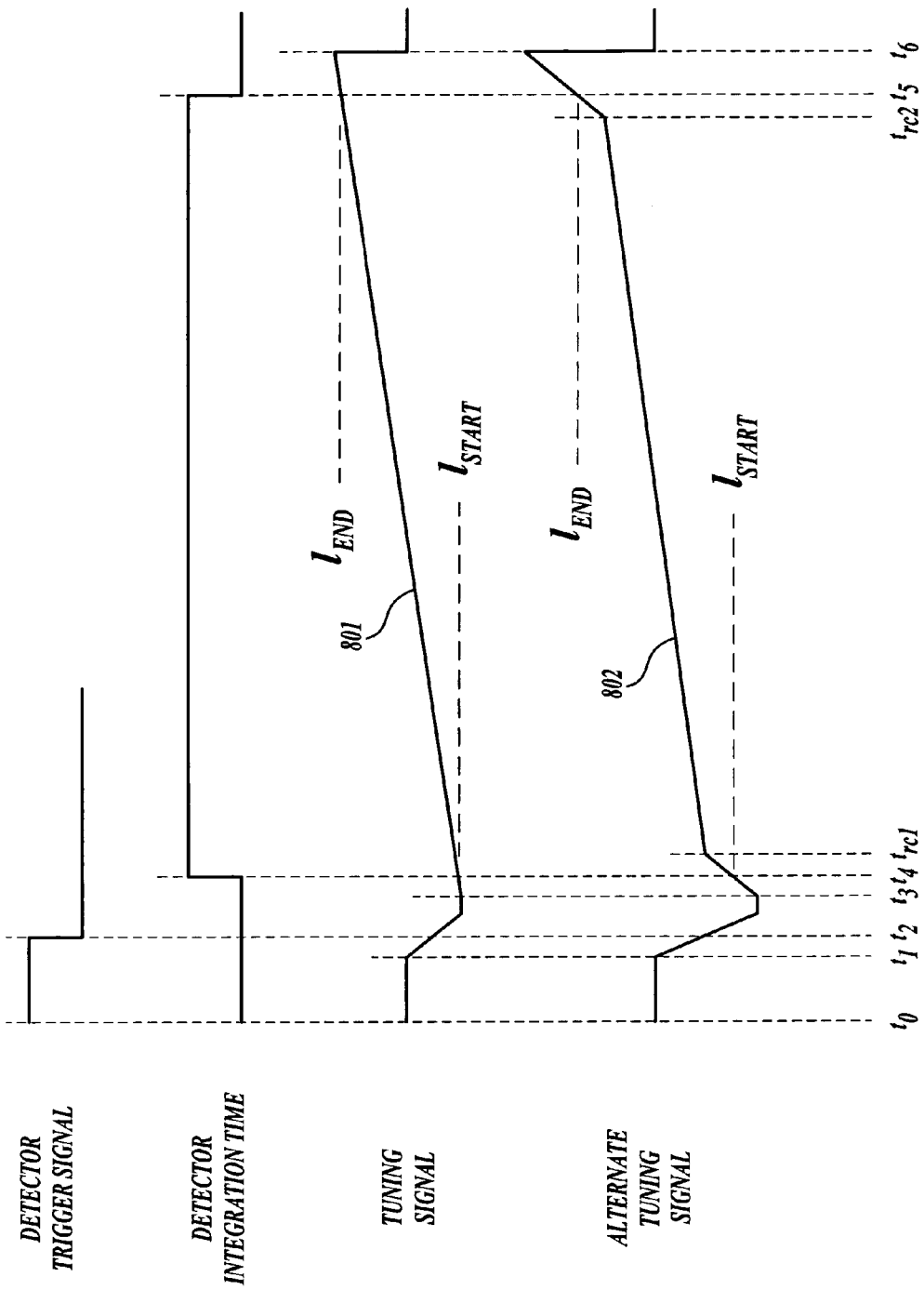
FIG. 8 is a timing diagram illustrating a first exemplary method of varying an illumination wavelength and integrating a corresponding signal on a detector in accordance with the present invention.

FIG. 8 is a timing diagram illustrating a first exemplary method of varying an illumination wavelength and integrating a corresponding signal on a detector in accordance with the present invention. In particular, FIG. 8 shows an operation sequence usable to acquire a signal from any interferometer detector signal channel, that signal usable to determine an offset signal component of that detector signal channel. The timing of operation sequence may be determined based on clock signals and/or other signals provided by or available to the control system 170 and/or the offset determining circuit, routine or application 171. As shown in FIG. 8, the operation sequence begins at a time $t_0$. Assuming the tunable laser source 110A of the interferometer system is initially at a nominal operating wavelength somewhere near the middle of its operating range, at a time $t_1$ the offset determining circuit, routine or application 171 issues a tuning signal to the tunable laser source 110A which causes the tunable laser source 110A to begin tuning to a wavelength somewhat less than a desired $\lambda_{start}$.

At a time $t_2$ the offset determining circuit, routine or application 171 issues a detector trigger signal to the detector subsystem 150 that initiates a signal acquisition sequence of the detector subsystem 150. For example, in various exemplary embodiments, the detector subsystem 150 comprises a relatively conventional CCD or CMOS camera system or chip and the detector trigger signal triggers an asynchronous reset of the camera. This initiates the image integration according to inherent capabilities of the camera. In any case, at a later time 4, the detector subsystem 150 begins a detector signal integration period. In various exemplary embodiments, when the detector subsystem 150 comprises the relatively conventional CCD or CMOS camera system or chip, the integration period comprises a programmable inherent integration period of the camera. In yet other exemplary embodiments, the integration period may correspond to the control of another type of electronic or physical shutter that effectively determines the period during which the detector receives and integrates an optical signal.

At a time $t_3$, the offset determining circuit, routine or application 171 issues a tuning signal to the tunable laser source 110A, which causes the tunable laser source 110A to begin sweeping the wavelength. It should be appreciated from the foregoing discussions that even for a constant OPD z, this will cause a variation in the signal that is integrated by the detector, starting at wavelength $\lambda_{start}$ corresponding to the time $t_4$, and continuing until a wavelength $\lambda_{end}$ corresponding to the end of the detector integration period at the time $t_5$. The associated signal variation and integrated signal are discussed in greater detail with reference to FIG. 9, below. It should be appreciated that in various exemplary embodiments according to this invention, it is not necessary to take any particular measures to know or control the wavelengths $\lambda_{start}$ and $\lambda_{end}$. Rather, these wavelengths may vary from measurement to measurement, and these wavelength designations are simply convenient descriptors for the various wavelengths that may correspond to the beginning and end of the integration period according to the inherent characteristics of various components of the interferometry system 100A.

In general, it is desirable in various exemplary embodiments according to this invention that the tunable laser source 110A completes the operation of sweeping the wavelength at a time $t_6$ that is after the end of the detector integration time $t_5$, for reasons that will be made apparent further below. At the time $t_6$ offset determining circuit, routine or application 171 issues a tuning signal to the tunable laser source 110A, which causes the tunable laser source 110A to reset to a desired operating wavelength for a normal interferometry measurement mode of the interferometer system 100A.

It should be appreciated that the embodiment shown in FIG. 8 is appropriate when the amount of time required to slew the tunable laser 110A to the lower end of the desired tuning range is significantly longer than the time required to initialize or reset the detector subsystem 150 in preparation for signal integrations. In such cases, in order for the laser to begin scanning from the lower end of the desired tuning range before the integration period begins, the operations described for the time $t_1$ must precede the operations described for the time $t_2$. However, it should be appreciated that this is not necessarily required if the laser can slew to the lower end of the desired tuning range faster than the detector initialization or reset operations. More generally, it is sufficient in various exemplary embodiments according to this invention that the tunable laser source 110A completes the operation of retuning to a wavelength somewhat less than the desired $\lambda_{start}$ at a time $t_3$ that is prior to the start of the detector integration time $t_4$, for reasons that will be made apparent below.

It should be appreciated that in various exemplary embodiments, the sweep direction may be inverted compared to that previously described. That is, in general, $\lambda_{start}$ may be either a longer wavelength or a shorter wavelength than $\lambda_{end}$. In various exemplary embodiments, during the integration period the wavelength change is proportional to the tuning signal change, and is linear with time as shown by the tuning signal 801. In various other exemplary embodiments according to this invention, it is sufficient if the wavelength change rate $d\lambda/dt$ varies somewhat over the integration period, but generally varies insignificantly over a time period comparable to several cycles of the optical signal into the detector, for a majority of the integration period.

In various exemplary embodiments according to this invention, a camera is included in the detector subsystem, the various pixels of the camera providing detectors usable according to the principles of this invention. In one exemplary embodiment of such a camera, the camera is a "Dragonfly" camera available from Point Gray Research, located at 305–1847 West Broadway, in Vancouver, British Columbia, Canada. In various operating modes, the Dragonfly camera supports integration periods from $\frac{1}{30}$ of a second to $\frac{1}{8000}$ of a second. Thus, it is reasonable that the integration period in various exemplary embodiments according to this invention is shorter than at least one of 67 milliseconds, 34 milliseconds, 10 milliseconds, 1 millisecond, 200 microseconds, 100 microseconds, 20 microseconds and 5 microseconds. It should be appreciated that in various embodiments according to this invention that determine a time average of a signal integrated during the integration period, it is desirable to know the duration of the effective signal integration period to an accuracy that is on the order of the desired residual error value $\epsilon$, described in detail below. This is generally easily obtained for longer integration periods, but requires care, for high accuracy applications that use integration times on the order of a few hundred microseconds or less. In such cases, known high accuracy time-measurement techniques using relatively higher speed period-measurement clocks, or the like, can be used to provide the required accuracy.

Figure 9:
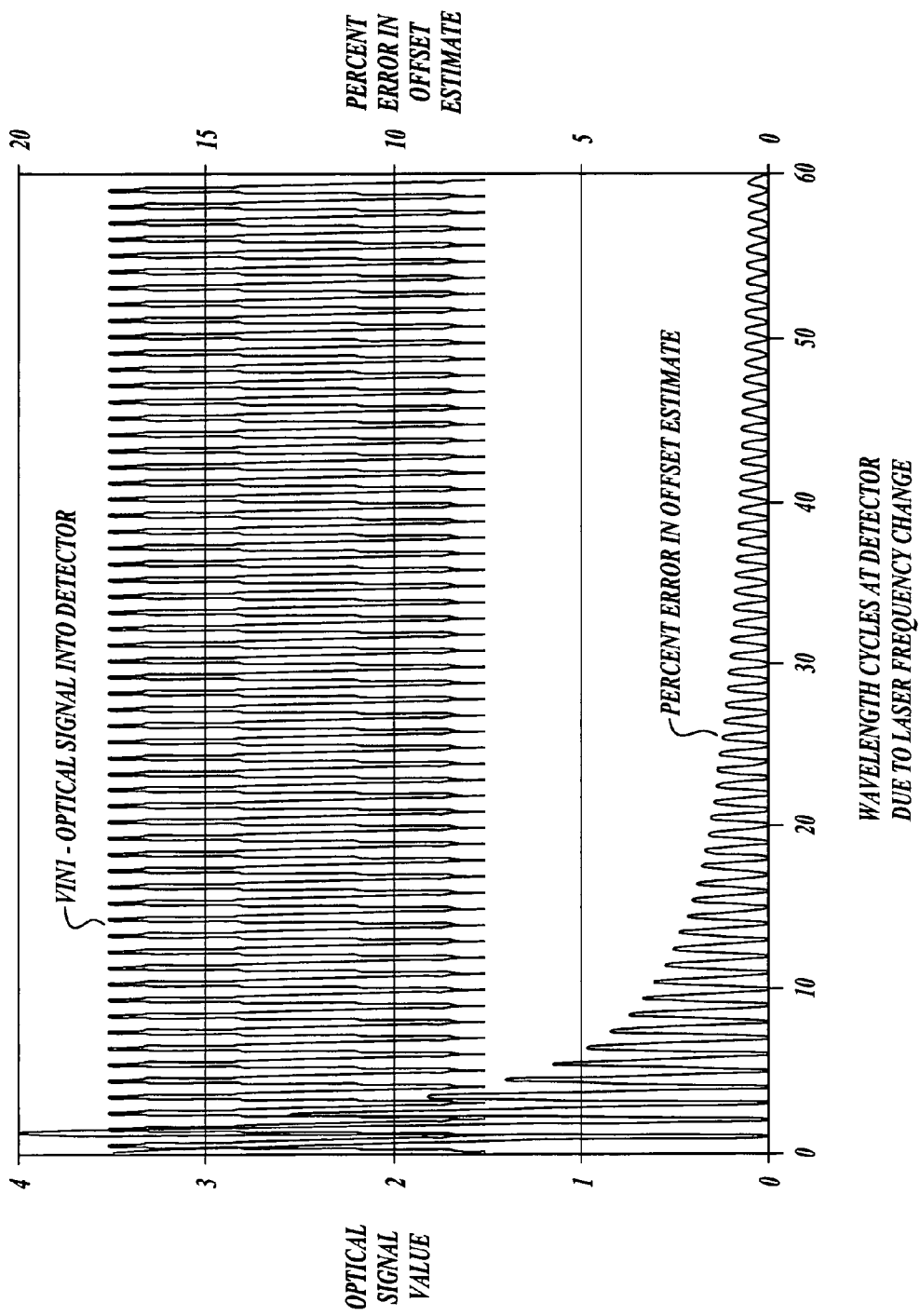
FIG. 9 is a plot illustrating the behavior of an optical signal $VIN_1$ into a detector, and the time average of a detector signal that integrates the signal $VIN_1$ as wavelength cycles accumulate on the detector due to a continuing change in the frequency or wavelength of the interferometer laser source.

FIG. 9 includes a plot illustrating the behavior of an optical signal VIN1 into a detector, and a plot of Percent Error In Offset Measurement. The plot of Percent Error In Offset Measurement shown in FIG. 9 represents the general behavior of the time average of the integrated signal from a detector that integrates the signal VIN1 as wavelength cycles accumulate on the detector due to a continuing change in the frequency or wavelength of the interferometer laser source. The optical signal VIN1 present at the detector may be determined according to EQUATION 4. When the OPD z is constant, the wavelength sweep range is relatively small in comparison to the nominal wavelength, and the wavelength sweep is linear with time, as described for the tuning signal 801, the optical signal VIN1 will be a periodic signal of approximately constant amplitude as illustrated in FIG. 9.

The time average of the integrated detector output can be written as shown in EQUATION 9:

$$\overline{VIN1} = \frac{1}{T}\int_0^T VIN1(t)dt \qquad \text{(Eq. 9)}$$

where T is the duration of the integration period. It should be noted that when λ is proportional to t, the integration could also be performed over λ.

Since VIN1 is a periodic function, we find that:

$$\overline{VIN1} = C1 + \epsilon \qquad \text{(Eq. 10)}$$

where C1 is the offset signal component to be determined for the detector channel and ε is a cyclic residual error value that depends on the optical phase of VIN1 at the start and end of the integration period, which is in turn determined according to EQUATION 4, and by $\lambda_{start}$ and by $\lambda_{end}$. Since VIN1 is a periodic function, the residual error value ε will generally vary periodically with accumulated wavelength cycles.

It is desirable to minimize ε, since this limits the uncertainty in determining the offset signal contributions according to the principles of this invention. This can be achieved, in various exemplary embodiments, by maximizing the number of cycles of the signal VIN1 that occur within the integration time period. The number of cycles, N, is given by EQUATION 11:

$$N = \frac{|\lambda_{start} - \lambda_{end}|}{\lambda_{start}\lambda_{end}} z \qquad \text{(Eq. 11)}$$

It is apparent that N can be increased by either increasing the wavelength range $|\lambda_{start}-\lambda_{end}|$ and/or z, the OPD between the two interferometer arms. As a practical matter, the maximum value of z will generally be limited by the configuration of the interferometer and the test object 130. At one design extreme, z will have an upper limit that is limited by the coherence length of the laser source. For existing interferometer designs, increasing the wavelength range is generally the most practical way to significantly increase N.

As previously mentioned, the plot of Percent Error In Offset Measurement shown in FIG. 9 represents the general behavior of the time average of an integrated detector output as wavelength cycles accumulate on the detector due to a continuing change in the frequency or wavelength of the interferometer. The value of the Percent Error In Offset Measurement at any point along the horizontal axis in FIG. 9 corresponds to the magnitude of the residual error value ε. As shown in FIG. 9, as the number of integrated cycles of the signal VIN1 increases, the residual error value ε decreases. Stated another way, as the number of integrated cycles of the signal VIN1 increases, the time average of that integrated signal converges to the DC level of the signal VIN1, which is the same as the DC level corresponding to the offset signal component that is to be determined. For the example optical signal VIN1 shown in FIG. 9, the residual error value ε decreases to significantly less than 1 percent of the offset signal component that is to be determined, after approximately 60 wavelength cycles are integrated by the detector.

To further illustrate the operation of the present invention in one exemplary embodiment, the interferometer system 100A may be an absolute or two-wavelength interferometer system that generally provides a nominal OPD of 50 mm and operates at two closely spaced wavelengths around 780 nm. In an offset determining mode of operation as outlined above with reference to FIG. 8, some approximate exemplary values are $\lambda_{start}$=780 nm and $\lambda_{end}$=780.5 nm. Accordingly, for such a wavelength change, approximately 41 cycles are accumulated during the integration period. The number of cycles is calculated from 50 mm/780 nm=64,102.6 cycles and 50 mm/780.5 nm=64,061.5 cycles, the difference thus being approximately N=41 cycles.

When the corresponding optical signal VIN1 has the approximate ratio of AC and DC component magnitudes shown in FIG. 9, the maximum residual error value ε is approximately 0.7%. We state a maximum residual error value, because, in general, the optical phase of VIN1 is unknown and "uncontrolled", as described previously, and further below, with reference to FIG. 10. Furthermore, even when all portions of the test object are illuminated from the same source, when the OPD z values of two different portions are significantly different, the number of wavelength cycles appearing at the corresponding different detectors will be different. Thus, due to the topography of a test object, even with simultaneous illumination, and simultaneous integrations periods, two "non-congruent" detector channels will generally integrate a somewhat different number of wavelength cycles. Consequently, in general, the results of any particular signal integration for any particular detector will rarely, if ever, correspond to an integer number of wavelength cycles. The number of wavelength cycles integrated in various embodiments according to this invention is typically a non-integer number of wavelength cycles, and could equally correspond to any value of ε on the cyclic residual error curve, for example, either a peak or a valley, in the vicinity of N=41.

It will be appreciated that the foregoing exemplary embodiment is intended to be illustrative only and not limiting. For example, more generally, in various embodiments, any operable illumination wavelength may be used; the interferometer system can be a single wavelength "incremental" type interferometer; the wavelength change may be provided over a significantly wider range of wavelengths, which may increase the number of wavelength cycles per unit of time in various exemplary embodiments; the number of integrated cycles may be greater than approximately 40, or lesser than 40 and significant offset correction benefits may still be provided in various embodiments—for example, the number of integrated cycles may be on the order of 20 cycles, or 10 cycles in various less accurate embodiments. These and other of variations will be apparent to one of ordinary skill in the art.

Furthermore, although the foregoing embodiments have outlined the use of a constant rate, or approximately constant rate, of uninterrupted wavelength change, which offers convenience and effectiveness in various exemplary embodiments according to this invention, this invention is not so limited. In yet other embodiments, the changing-wavelength illumination to the detector may be interrupted and resumed one or more times during the integration period, for example in the form of interrupting the illumination during a monotonic wavelength increase or decrease. Alternatively, the wavelength may be varied in the form of a repetitive wavelength change pattern and/or range, or in the form of a wavelength increase following a wavelength decrease, or vice-versa. Thus, more generally, in various exemplary embodiments, a wide variety of patterns or series of variations of the wavelength may be used during the integration period, provided that such patterns or series of variations are compatible with the various timing and control capabilities of the interferometer system, and at least approximately fulfill the generally desirable conditions outlined previously. However, should be appreciated that such patterns or series of variations of the wavelength may be less convenient and less accurate than a simple monotonic wavelength variation.

In practice, the foregoing method described with reference to FIGS. 8 and 9 can be used for any detector channel of a wide variety of interferometer systems. The time averaged value of the integrated signal VIN1, as determined over the integration period of the detector, and over a desired number of wavelength cycles that is sufficient to reduce the residual error value $\epsilon$ to a desired level, is the same as the DC level corresponding to the offset signal component that is desired for compensation purposes in various embodiments. In terms of EQUATION 4, for example, this determined offset signal component is the value $C_1$. Thus, this offset signal component for a detector channel can be multiplied by the integration time used for an interferometry measurement signal by that detector channel, and then subtracted from that signal. Such a subtraction leaves only a relatively ideal desired interferometry signal component comparable to that indicated by EQUATIONS 1 and 2. Accordingly, interferometry measurement values, including high levels of interpolation within a particular wavelength, may be determined from such signals according to EQUATION 3.

While the previous result is adequate for many applications, it is often desirable to cancel the offset signal components to a higher level, preferably to better than 0.1%, without having to increase N. This is particularly important for absolute interferometers where several wavelengths are used to measure distance over a range much greater than when a single wavelength is used. A further exemplary embodiment of the present invention that includes a method to further improve the accuracy of the offset determination is described below with reference to FIG. 10.

Figure 10:
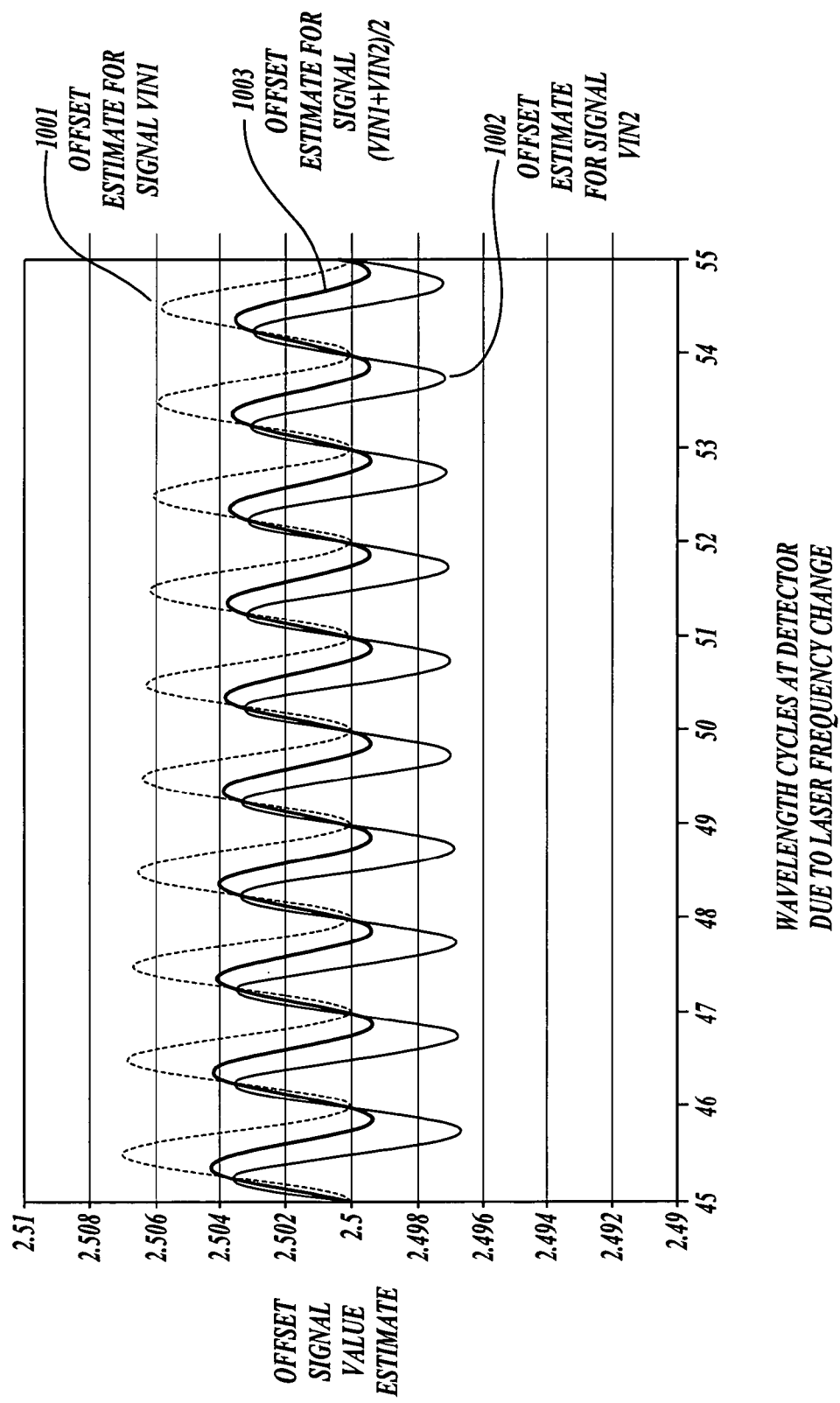
FIG. 10 is a plot illustrating the behavior of the time average of detector signals that integrate input optical signals VIN1 and VIN2, as well as a signal that is the average of those two time averaged signals, as wavelength cycles accumulate on the detectors due to a continuing change in the frequency or wavelength of the interferometer laser source.

FIG. 10 is a plot illustrating the behavior of respective signals 1001 and 1002 that indicate the time average of the integrated detector response to the input optical signals VIN1 and VIN2, respectively, as well as a signal 1003 that is the average of those two time averaged integrated signals, as wavelength cycles accumulate on the detectors due to a continuing change in the frequency or wavelength of the interferometer laser source. In the example shown in FIG. 10, the input optical signals VIN1 and VIN2 (not shown) are the typical quadrature input signals of an interferometer that come from the same portion of the test object and are used for signal interpolation to determine the distance to the that portion of the test object with high resolution, as previously described. Thus, the optical signal VIN2 present at its respective detector may be determined according to EQUATION 5. Otherwise, the optical signal VIN2 and the behavior of its corresponding time averaged integrated detector signal, or offset signal value, are similar to those previously described with reference to the signal VIN1 and FIG. 9. It should be appreciated that according to this particular embodiment, both signals are integrated over the same integration period with the same start and end times. In various exemplary embodiments where each individual signal is detected and integrated by individual pixels of the same camera, such an integration period is typically provided by the camera for both pixels.

It should be appreciated that the vertical scale in FIG. 10 is magnified compared to that shown in FIG. 9, to emphasize the small variations that occur in the residual error value $\epsilon$ of the Offset Signal Value Estimate after integrating the 45 to 55 wavelength cycles shown along the horizontal axis in FIG. 10.

In the illustrative example shown in FIG. 10, the Offset Estimate Value for Signal VIN1, curve 1001, which is the same as the time average of the integrated signal value for VIN1, is for a signal having a nominal offset component of 2.5 units, and an AC amplitude of 1 unit. Similarly, the Offset Estimate Value for Signal VIN2, curve 1002, which is the same as the time average of the integrated signal value for VIN2, is for a signal having a nominal offset component of 2.5 units, and AC amplitude of 1 unit. This is a reasonable illustrative example because, in general, for a variety of interferometer systems we expect the offset and amplitude values of the quadrature optical input signals VIN1 and VIN2 to be nearly equal.

It should be appreciated that the curves 1001 and 1002 are displaced from each other in FIG. 10 because each signal VIN1 and VIN2 has a different respective optical phase at any time within the integration period due to their quadrature relationship. In addition, it should be appreciated that both quadrature signals also have a shared optical phase shift component that will generally vary from offset measurement to offset measurement, depending on the OPD z, the nominal or initial wavelength, and the like. This shared optical phase shift component is shared because the detectors related to the quadrature signals are generally congruent, that is, they both receive optical signals arising from the same portion of the object. In general, this shared optical phase shift component will impart various related "uncontrolled" displacements to each of the corresponding integrated signal curves, which will correspondingly vary from offset measurement to offset measurement.

It should be appreciated that, in general, the displacement of either of the curves is generally unknown, as previously described, and therefore it is not possible to know which of the curves is likely to be the "worst" for any particular offset determination measurement. However, regardless of the displacements, we find that such optical phase-related effects displace the curves 1001 and 1002 along the vertical axis relative to the nominal DC offset value of their respective input signals, but not by more than plus or minus one half of their peak-to-peak value (the curve 1001 illustrates such a maximum displacement.)

In any case, it is possible to make an offset determination measurement for both signals, and to average those offset measurements. The curve 1003 shows the average of the values of the curves 1001 and 1002. As illustrated by the example shown in FIG. 10, the "average" curve 1003 will always provide an estimate of the offset of the signals VIN1 and VIN2 that has a smaller worst case (peak) residual error value $\epsilon$ than the worst one of the individual time averaged integrated signal curves 1001 and 1002. Thus, this average curve 1003 is, in general, a better estimate of the offset.

Furthermore, knowing the limit for the possible displacement of the time averaged integrated signals, as previously described, and knowing the phase relation between the quadrature optical input signals VIN1 and VIN2, we can determine a worst case (peak) residual error value $\epsilon$ for the average, just as we previously did for an individual time averaged integrated signal. For N=41, we find the worst case (peak) residual error value $\epsilon$ for the average to be ~0.2% which is substantially lower than the worst case (peak) residual error value $\epsilon$ corresponding to the individual offset estimate.

It should be appreciated that the foregoing averaging technique is also applicable to related relatively phase-shifted signals similar to the quadrature signals VIN1 and VIN2, but having a relative phase shift other than 90 degrees, and the averaging technique will still provide at least some of the previously described benefits. For example, the averaging technique may also be applied to the comparable related relatively phase-shifted signals of various three-phase, or higher-phase, interferometer systems, and the like.

Figure 11:
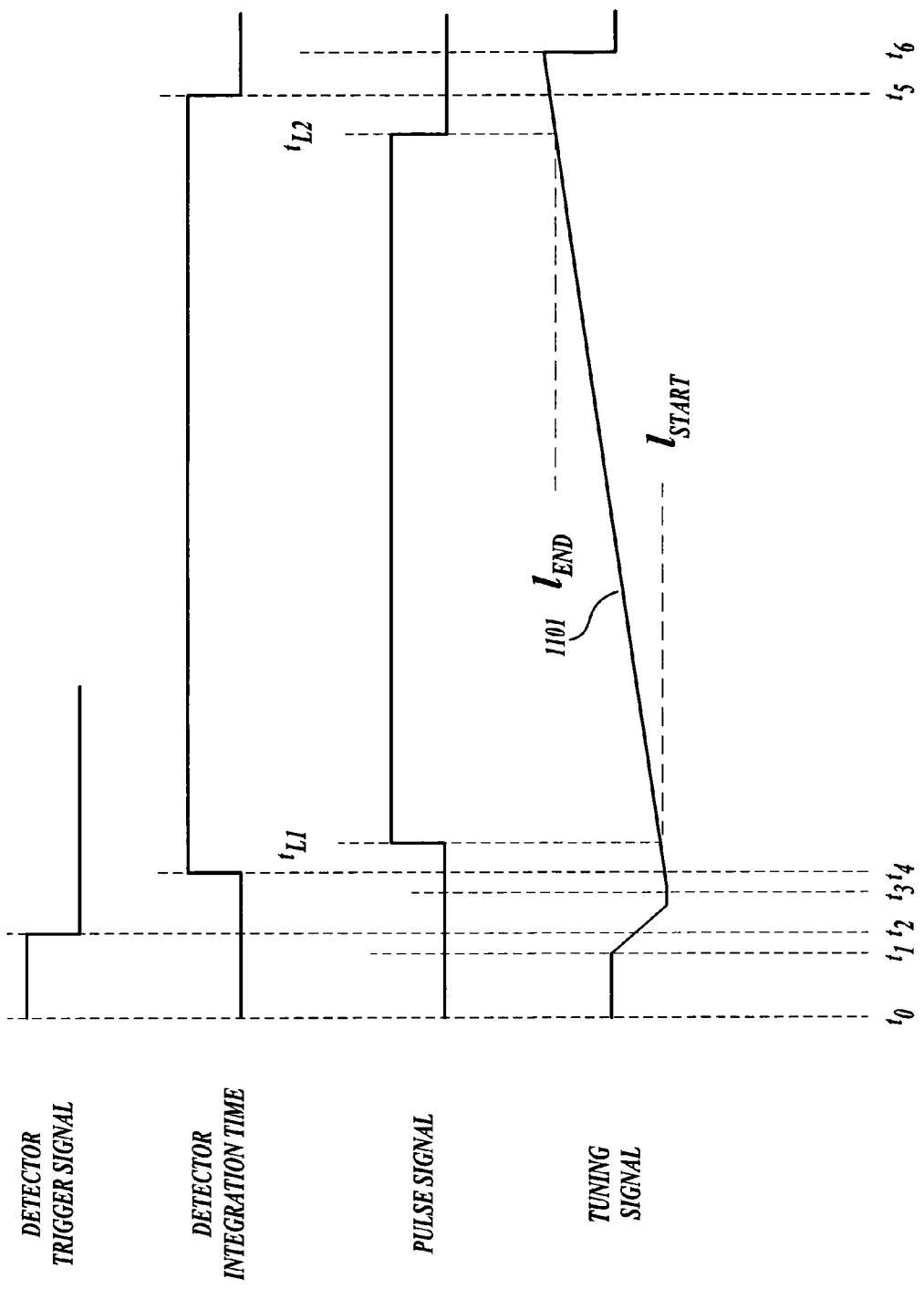
FIG. 11 is a timing diagram illustrating a second exemplary method of varying an illumination wavelength and integrating a corresponding signal on a detector in accordance with the present invention.

FIG. 11 is a timing diagram illustrating a second exemplary method of varying an illumination wavelength and integrating a corresponding signal on a detector in accordance with the present invention. As previously discussed, it is generally advantageous to provide the signals necessary to eliminate and/or compensate various offset errors in a very short time. This not only makes the offset determination faster, which increases the possible measurement or sampling frequency of the interferometer, it also reduces the sensitivity of the offset determination method to the previously discussed inevitable vibrations. FIG. 11 shows a method for controlling or limiting the effective time for integrating an optical signal according to the principles of this invention by controlling the laser illumination to a time that is shorter than the full integration period of a detector. It should be appreciated that such a method may be useful in a variety of circumstances, including at least: a) shortening the effective optical signal integration period below an inherent integration period of a detector, for example, in order to reduce vibration-induced variations between measurements, and b) to effectively synchronize to a high degree of accuracy the effective optical signal integration period of multiple cameras or detectors, especially when the inherent signal integration periods of such cameras or detectors are not otherwise conveniently synchronized to a desired degree.

Similar to FIG. 8, FIG. 11 shows an operation sequence usable to acquire a signal from any interferometer detector signal channel, that signal usable to determine an offset signal component of that detector signal channel. Several of the operations related to FIG. 11 are similar or identical to those previously described with reference to FIG. 8 and such operations will be apparent to one of ordinary skill in the art. Therefore, such operations are not described in detail below.

A primary difference of the operations related to the sequence shown in FIG. 11 is that the Pulse Signal corresponds to the actual illumination period of the tunable laser 110. That is, when the Pulse Signal is low, the laser is effectively "off", and when it is high, the laser is effectively on. In a first embodiment of such laser illumination control, it is known in the art that the forward current of a laser diode or the like can be controlled such that it is just below a threshold level sufficient to induce lasing. In such a state, the laser is "off", but will turn on with an exceptionally short response time, on the order of nanoseconds, when the forward current is increased. The Pulse Signal corresponds to such a control mode for the tunable laser. In a second embodiment of such laser illumination control, the laser has an output during the "off" period, but when the Pulse Signal is low the laser output is blocked by a shutter of a type that will provide a desired fast, or ultra-fast, response time. Conversely, when the Pulse Signal is high, the shutter is opened and the laser is effectively on.

An additional difference is related to the significance of the Tuning Signal. Various types of tunable lasers depend on illumination feedback to precisely control the tuned wavelength. Thus, when the laser output is actually "off" in the first embodiment of laser illumination control, the Tuning Signal indicates an open-loop control signal sent to the tuning mechanism of the Tunable Laser. The open-loop control signal adjusts the tuning mechanism, or the like, to an operating position, or the like, that will provide a wavelength that is approximately a target wavelength corresponding to the open loop signal when the laser is turned on. In various exemplary embodiments, the response time of the closed-loop tuning control of the tunable laser may be such that when the laser is turned on, the laser wavelength will "ring" unacceptably during the initial close-loop tuning period. Such tunable lasers may be operated in the previously described open-loop tuning mode throughout the sequence of operation shown in FIG. 11, in order to avoid such problems. It should be appreciated that because the systems and methods according to the present invention do not require any particular control or measurements of the laser wavelength, such open loop control will be sufficiently accurate for determining the offset in various exemplary embodiments according to this invention. In embodiments that include the previously described second embodiment of laser illumination control, the Pulse Signal controls the operation of the shutter. In the following description, only an embodiment corresponding to the first embodiment of laser illumination control is described. The required differences and operations corresponding to embodiments corresponding to the second embodiment of laser illumination control will then be apparent to one of ordinary skill in the art, having the benefit of the following description.

The operation sequence begins at a time $t_0$. At a time $t_1$ the offset determining circuit, routine or application 171 issues a tuning signal to the tunable laser source 110A which causes the tuning mechanism of the tunable laser source 110A to begin an adjustment corresponding to a wavelength somewhat less than a desired $\lambda_{start}$. At a time $t_2$ the offset determining circuit, routine or application 171 issues a detector trigger signal to the detector subsystem 150 that initiates a signal acquisition sequence of the detector subsystem 150. For example, in various exemplary embodiments, the detector subsystem 150 comprises a relatively conventional CCD or CMOS camera system or chip and the detector trigger signal triggers an asynchronous reset of the camera. At a later time $t_4$, the detector subsystem 150 begins a detector signal integration period. At a time $t_3$, the offset determining circuit, routine or application 171 issues a tuning signal to the tunable laser source 110A which causes the tuning mechanism of the tunable laser source 110A to begin an adjustment corresponding to sweeping the wavelength.

At a time $t_{L1}$ that is later than the time $t_4$, the offset determining circuit, routine or application 171 issues a Pulse Signal to the tunable laser source 110A which causes the tunable laser source 110A to begin lasing. In combination with the Tuning Signal, this will cause a variation in the signal that is integrated by the detector, starting at wavelength $\lambda_{start}$ corresponding to the time $t_{L1}$, and continuing until a wavelength % end corresponding to a time $t_{L2}$ when the Pulse Signal to the tunable laser source 110A ends, causing the tunable laser source 110A to stop lasing before the end of the detector integration period at the time $t_5$. At the time $t_6$ offset determining circuit, routine or application 171 issues a tuning signal to the tunable laser source 110A, which causes the tunable laser source 110A to reset to a desired operating wavelength for a normal interferometry measurement mode of the interferometer system 100A.

According to the above description, in this embodiment, it is the Pulse Signal to the tunable laser 110A, not the detector integration period itself, which determines the timing and duration of the signal that is integrated by the detector to determine the offset signal according to the principles of this invention. It should be appreciated that according to this embodiment, the duration of the signal that is integrated by the detector can be much, much shorter than an inherent integration period of a camera or a detector, and may be precisely timed, despite various uncontrollable operation latencies that may otherwise be present on the operation of a camera, or detector, or the associated electronic circuits or software operation of an interferometer system.

It should be appreciated that when the duration of the signal that is integrated by the detector, that is the duration of the Pulse Signal and the laser illumination, is much, much shorter than the inherent integration period of a camera or a detector, then the time $t_3$—when the offset determining circuit, routine or application 171 issues a tuning signal to the tunable laser source 110A that causes the tuning mechanism of the tunable laser source 110A to begin an adjustment corresponding to sweeping the wavelength—is preferably just before the time $t_{L1}$, and is very likely to be after the integration period start time $t_4$, contrary to the particular example shown in FIG. 11. Furthermore, the tuning signal should provide a wavelength sweep rate that provides the majority of the desired "full" wavelength sweep just between the illumination starting and ending times $t_{L1}$ and $t_{L2}$, such that the integrated signal still includes the desired number of wavelength cycles, despite the shorter effective signal integration time.

In one exemplary embodiment, the operations described with reference to FIG. 11 are implemented by including the laser drive and control circuit shown in FIG. 12 in the interferometer system 100A, as shown in FIG. 7.

Figure 12:
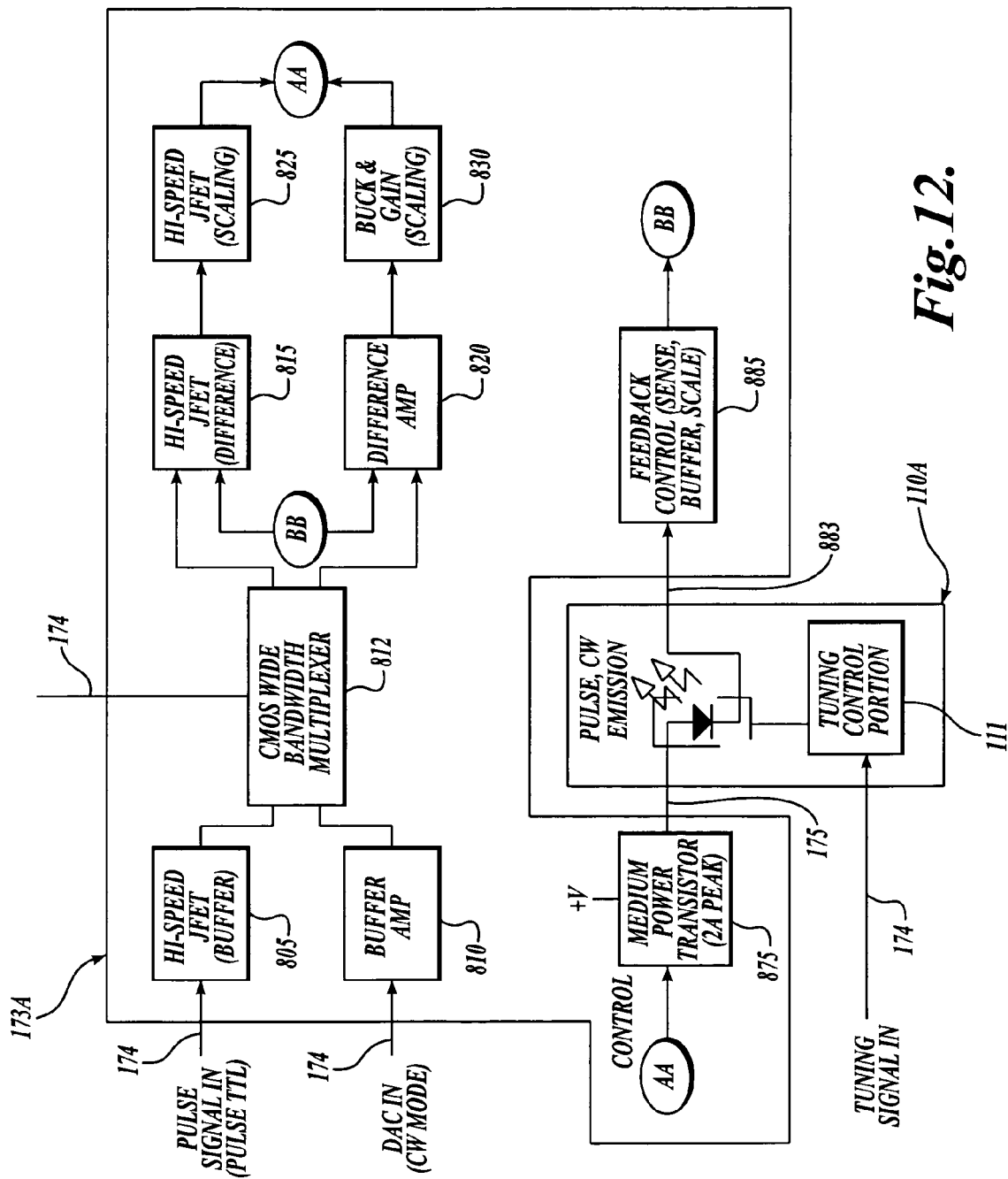
FIG. 12 is a block diagram that illustrates one exemplary laser drive and control circuit usable with the timing method shown in FIG. 11 in various specific embodiments of the interferometer system shown in FIG. 7.

FIG. 12 is a block diagram that illustrates one exemplary embodiment of the laser drive and control circuit, routine or application 173 shown in FIG. 7, and the laser drive and control circuit 173A that is usable with the timing method shown in FIG. 11 in various specific embodiments of the interferometer system 110A shown in FIG. 7. The laser drive and control circuit 173A may be implemented using generally known conventional circuit elements and conventional circuit design techniques, according to the following description. In one exemplary embodiment, the components of laser drive and control circuit 173A are selected to provide a high-speed, feedback-controlled current driver capable of operating a current source for a diode laser, or the like, at pulse rates as high as 5 MHz. In various exemplary embodiments, the components are selected to provide a laser response time that is approximately one microsecond or less. That is, lasing is initiated within approximately one microsecond after receiving the leading edge of the input control signal PULSE SIGNAL IN. In various exemplary embodiments, the components are selected to provide peak currents as high as is necessary to provide for a laser pulse duration as short as 500 nsec and as long as 40 msec.

As shown in FIG. 7, the laser drive and control circuit 173A is interconnected with the control system 170A and the tunable laser 110A by the signal and/or control lines 174 and 175, respectively, as previously described with reference to FIG. 7. A fast-response medium or high power transistor 875, capable of providing the required current to the laser source of the tunable laser 110, is connected to drive the laser source according to a control signal AA provided as described below. The tunable laser 110A includes means for providing a feedback control signal 883 that corresponds to the output power of the tunable laser 110A. In various exemplary embodiments, the feedback control signal 883 may comprise a portion of the light from the laser source.

The feedback control signal 883 is provided to a buffer circuit portion 885, which senses and/or amplifies or scales the feedback control signal 883 in various exemplary embodiments to provide the feedback control signal BB.

The laser drive and control circuit 173A may be operated in two separate modes. In the pulse mode, suitable for offset determination operations, the control signal PULSE SIGNAL IN is input to a high speed JFET input buffer 805. The signal PULSE SIGNAL IN comes from the offset determining circuit, routine or application 171, as previously described with reference to FIG. 11. A CMOS multiplexer 812 is controlled by an appropriate pulse mode enabling signal(s) from the offset determining circuit, routine or application 171 or the control system 170A over the signal and/or control lines 174, to route the control signal PULSE SIGNAL IN to a high speed JFET difference amplifier 815. The JFET difference amplifier 815 also receives the feedback control signal BB from the buffer circuit portion 885. A difference signal is output by the JFET difference amplifier 815 to a high speed JFET amplifier 825 that amplifies or scales the difference signal in various exemplary embodiments to provide the control signal AA that is input to the medium or high power transistor 875 that drives the laser source of the tunable laser 110A.

In a continuous illumination mode, a control signal DAC IN is input to an input buffer 810. The signal DAC IN comes from the control system 170A over the signal and/or control lines 174. The CMOS multiplexer 812 is controlled by an appropriate continuous illumination mode enabling signal(s) from the control system 170A over the signal and/or control lines 174 to route the control signal DAC IN to a difference amplifier 820. The difference amplifier 820 also receives the feedback control signal BB from the buffer circuit portion 885. A difference signal is output by the difference amplifier 820 to an amplifier 830 that amplifies or scales the difference signal in various exemplary embodiments to provide the control signal AA that is input to the medium or high power transistor 875 that drives the light source 880 in the continuous illumination mode. In the continuous illumination mode, the control signal AA is controlled below a maximum level that controls the current in the medium or high power transistor 875 and the laser source of the tunable laser 110A at a level that provides a long operating life for those components.

By having two such separate operating modes, the laser drive and control circuit 173A is ideal for alternately operating the tunable laser of an interferometer system in a pulse mode to support the offset determining operations outlined with reference to FIG. 11, and in a continuous mode for supporting the typical interferometry object measurement operations of the interferometer system. It will be appreciated that the laser drive and control circuit 173A makes it particularly convenient to synchronize the laser illumination with the operation of the TUNING SIGNAL IN, that is input to the tuning control portion 111 of the tunable laser 110A, as outlined with reference to FIG. 11.

Figure 13:
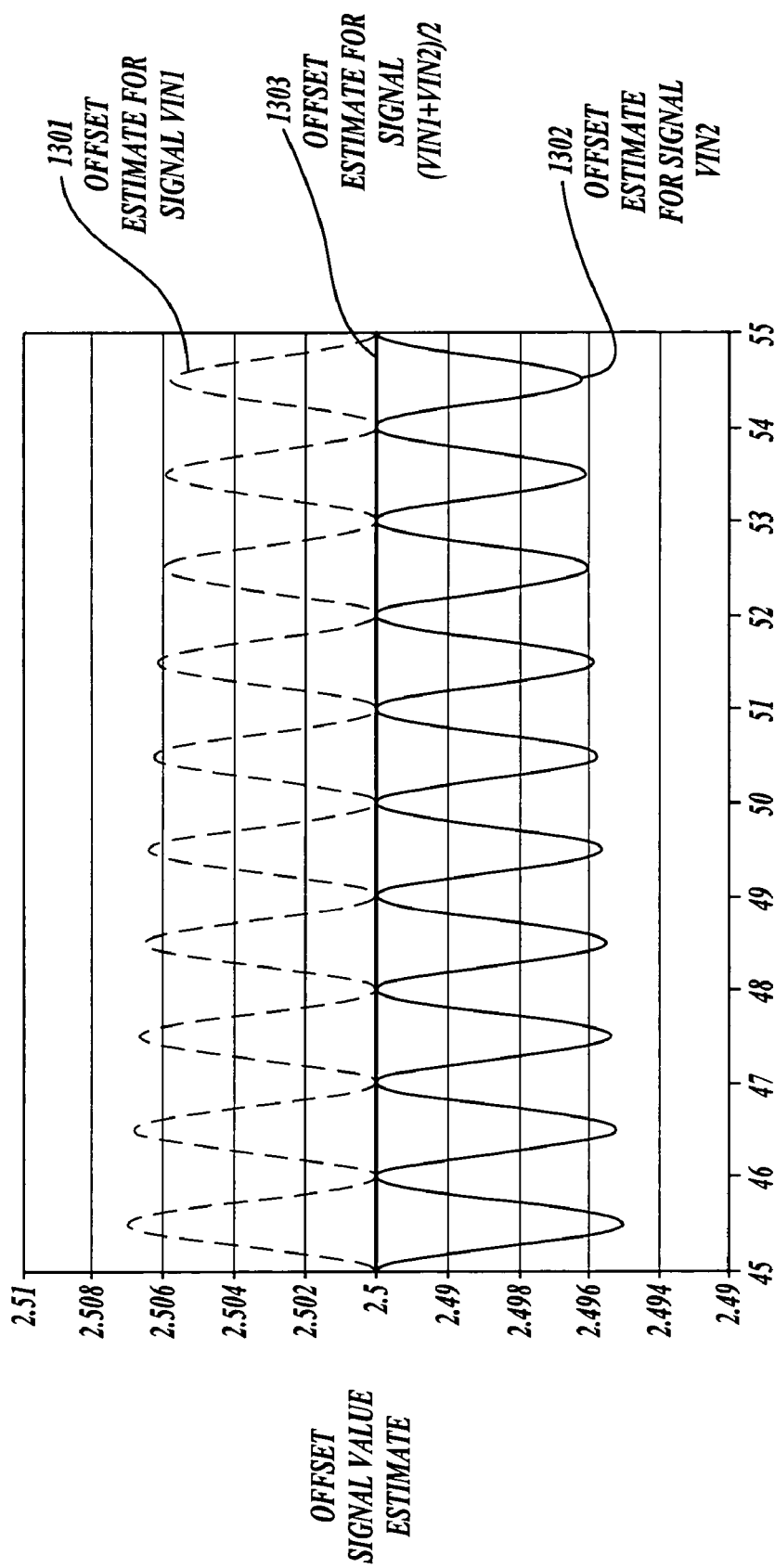
FIG. 13 is a plot illustrating the behavior of the time average of a detector signal that integrates the signal $VIN_1$ over a first time span, the time average of a detector signal that integrates the signal $VIN_2$ over a second time span that is delayed by one quarter of a wavelength cycle compared to the first time span, as well as a signal that is the average of those two time averaged signals, as wavelength cycles accumulate on the detectors due to a continuing change in the frequency or wavelength of the interferometer laser source.

In various embodiments where the interferometer system 110A includes two detectors or cameras that have integration periods that are precisely and separately controllable, and when the rate of change of the tunable laser wavelength is reasonably well known or controllable, the method previously described with reference to FIG. 10 can be further enhanced as illustrated in FIG. 13.

Similar to FIG. 10, FIG. 13 is a plot illustrating the behavior of the time average of respective detector signals 1301 and 1302 that integrate input optical signals VIN1 and VIN2, respectively, as well as a signal 1303 that is the average of those two time averaged integrated signals, as wavelength cycles accumulate on the detectors due to a continuing change in the frequency or wavelength of the interferometer laser source. The input optical signals VIN1 and VIN2 (not shown) are identical to those previously described with reference to FIG. 10. In addition, the general characteristics and behavior of the various signals related to FIG. 13 are similar or identical to those previously described with reference to FIG. 10, and such characteristics will be apparent to one of ordinary skill in the art. Therefore, such characteristics are not described in detail below.

As shown in FIG. 13, the curve 1301 is identical to the curve 1001 shown in FIG. 10, and shows the behavior of the time averaged detector signal that integrates the signal $VIN_1$ over a first time span. In contrast, the curve 1302 shows the behavior of the time averaged detector signal that integrates the signal $VIN_2$ over a second time span that is delayed by one quarter of a wavelength cycle compared to the first time span. Thus, since the signal VIN2 is ordinarily in quadrature with respect to the signal VIN1, by delaying the integration of the signal VIN2 by an additional one quarter of a wavelength cycle, the time averaged signal integration curve 1302 provides a signal that is effectively delayed by one half cycle relative to the curve 1301, as shown in FIG. 13. The average of the values of such curves, as shown by the average value curve 1303, has a worst case (peak) residual error value $\epsilon$ of approximately zero and is approximately equal to the DC offset value of each of the signals VIN1 and VIN2, during all portions of each wavelength cycle. This is generally true, regardless of any previously described shared optical phase shift that is shared for the two quadrature signals VIN1 and VIN2, since the associated vertical displacements of each signal would be equal and opposite.

In various embodiments where the interferometer system 110A includes two detectors or cameras that have integration periods that are precisely and separately controllable, and when the rate of change of the tunable laser wavelength is reasonably well known or controllable, it is possible to predict the required delay of the integration of the signal VIN2 in comparison to the integration period of the signal VIN1 based on the anticipated rate of wavelength change, and to control the integration periods of the detectors or cameras accordingly. The required delay $\delta t$ in the start of the integration window for VIN2 relative to that for VIN1 is shown by EQUATION 12:

$$\delta t = \frac{\lambda^2}{4z}\left(\frac{d\lambda}{dt}\right)^{-1} \text{ (corresponding to a } \pi/2 \text{ phase shift)} \quad \text{(Eq. 12)}$$

It should be appreciated that in various specific embodiments the OPD z for any particular portion of a test object may be sufficiently determined from various conventional interferometer measurements and known interferometer design parameters, and particularly in absolute interferometer embodiments, according to this invention. Alternatively, in various other specific embodiments, the wavelength can be scanned over a known range at a rate consistent with suitable signal processing that counts and measures, respectively, the number of resulting whole and partial wavelength cycles indicated by an individual detector channel, to sufficiently determine the OPD z for that individual detector channel and any congruent detector channels. It should be appreciated that even if the required delay $\delta t$ is slightly in error and/or the associated practical timing and control is less than ideal, the average of the integrated signal values according to this embodiment may still provide an offset estimate having a substantially further improved worst case (peak) residual error value $\epsilon$.

Figure 14:
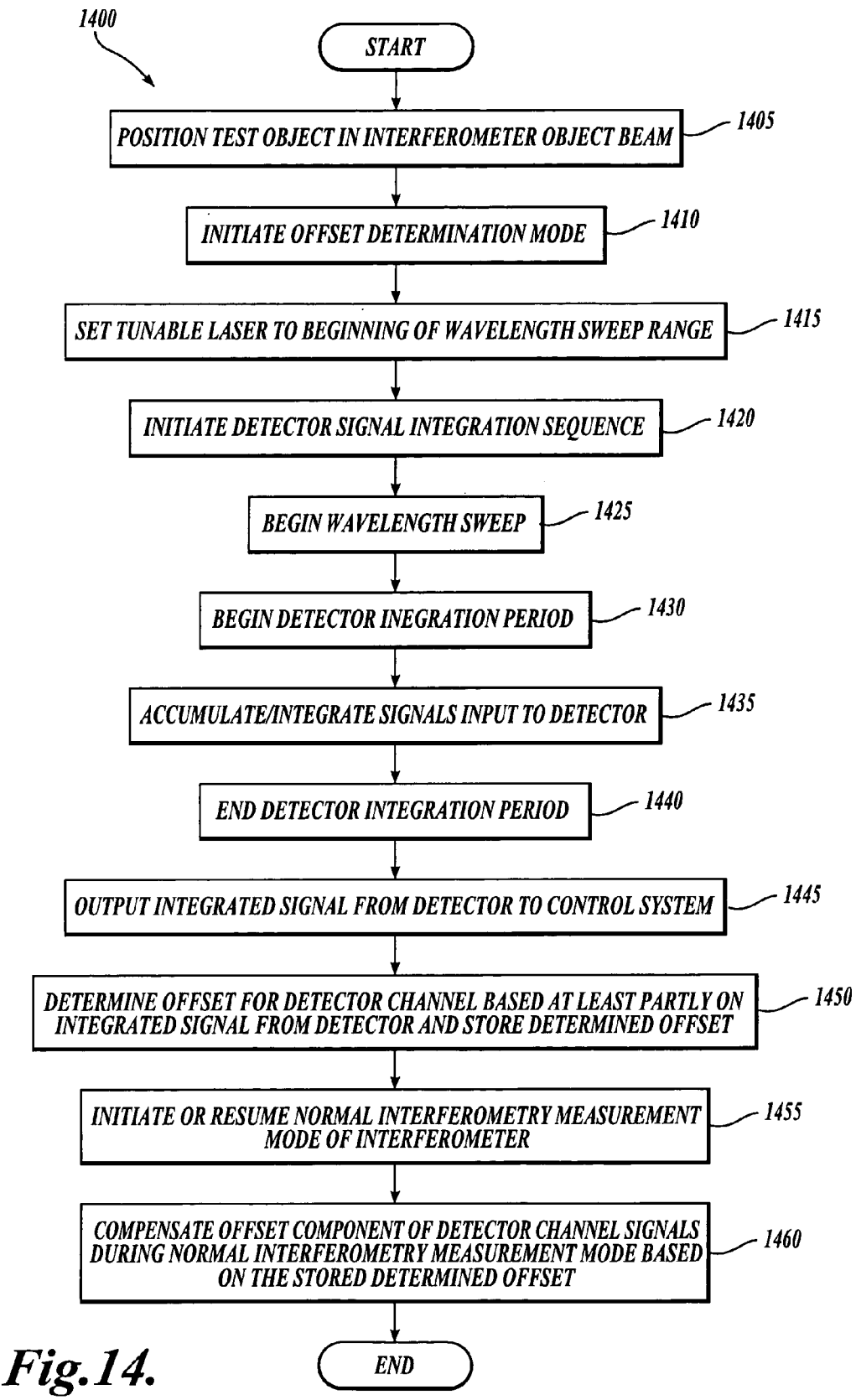
FIG. 14 is a flowchart illustrating a generic method for eliminating and/or compensating various offset errors in a detector channel of an interferometer in various exemplary embodiments according to this invention.

FIG. 14 is a flowchart illustrating a generic method 1400 for eliminating and/or compensating various offset errors in a detector channel of an interferometer in various exemplary embodiments according to this invention. As shown in FIG. 14, after starting, the method continues to the operations of a block 1405, where a test object is positioned in the object beam of the interferometer. The method then continues with the operations of a block 1410, where an offset determination mode is initiated for the interferometer. The offset determination mode then continues with the operations of a block 1415, which set a tunable laser of the interferometer to the beginning of a desired wavelength sweep range, as previously outlined with reference to FIG. 8 or 11, in various exemplary embodiments. The offset determination mode then continues with the operations of a block 1420, which begin a detector signal integration period, for example by initiating and asynchronous reset of a camera system in various exemplary embodiments.

The offset determination mode then continues with the operations of a block 1425, which begin a wavelength sweep of the tunable laser. In various exemplary embodiments, these operations begin an actual illumination wavelength sweep, as previously described with reference to FIG. 8. In various other exemplary embodiments, these operations begin an adjustment of the wavelength sweeping mechanism of the tunable laser, without providing actual illumination, as previously described with reference to FIG. 11.

The offset determination mode then continues with the operations of a block 1430, which begin a detector integration period, wherein the detector is set to accumulate the detector input signals as previously described. The offset determination mode then continues with the operations of a block 1435, wherein the detector actually begins to accumulate input signals. In various exemplary embodiments, the operations of the blocks 1430 and 1435 are indistinguishable, as previously described with reference to FIG. 8. In various other exemplary embodiments, the operations of the block 1435 correspond to actually initiating an illumination period of the tunable laser, and then ending the illumination period, as previously described with reference to FIG. 11.

The offset determination mode then continues with the operations of a block 1440, which end the detector integration period. The offset determination mode then continues with the operations of a block 1445 wherein the integrated signal is output from the detector to the control system of the interferometer and the operations of the block 1450 wherein the offset is determined for that detector channel of the interferometer, based at least partly on the value of the integrated signal from the detector. In various exemplary embodiments, the value of the time averaged integrated signal is determined, and is the same as the offset value to be determined. In various other exemplary embodiments, where offset determining and interferometery measurement determining integration periods are the same, the value of the integrated signal is the same as the offset value to be determined, as previously described with reference to FIG. 9. In various other exemplary embodiments, the offset value is determined for that detector channel as the average of two time averaged integrated quadrature signals, or the like, one of which is from that detector, as previously described with reference to FIGS. 10 and 13. The operations of the block 1450 then store the determined offset value in the control system of the interferometer.

The method then continues with the operations of the block 1455, where the offset determination mode ends when a normal interferometry measurement mode of the interferometer is initiated or resumed. The method then continues with the ongoing operations of a block 1460, wherein any detector channel signal provided by that detector during the normal interferometry measurement mode is compensated for offset using the stored determined offset value for that detector, as previously described, or by any other appropriate method, as will be apparent to one of ordinary skill in the art. The resulting compensated detector channel signal is used for determining the normal interferometry measurement values provide by the interferometer. The ongoing operations of the block 1460 continue until the method ends and/or is repeated.

It will be appreciated that the present invention as described above has a number of advantages, including at least those previously described, and as follows. One advantage is that the offset can be determined to a very high accuracy using the standard optical paths and standard detectors of a variety of interferometer systems. Another advantage is that only one data-acquisition sample is required (one frame). In addition, various exemplary emboidments of the method can be performed with sufficient accuracy without measuring or controlling the object height or the OPD z. The method also does not require accurate knowledge of the wavelength. In addition, the method does not require a precise sweep rate $d\lambda/dt$. Furthermore, the method does not require $d\lambda/dt$ to be precisely constant during the sweep.

As described above, the offset correction determining operations and the offset-corrected interferometry measurement signal operations are generally described such that the offset correction determining operations are performed for each individual detector channel, or each individual pair of detector channels that supply properly combinable quadrature signals, or the like. However, it should be appreciated that it is also within the scope of this invention to apply an offset correction determined for a particular detector channel to other particular detector channels. For example, a particular offset correction for a particular detector channel corresponding a particular portion or location on the test object may be applied in various embodiments to correct the offset of other detector channels that correspond to portions or locations on the test object that are proximate to, or otherwise known to be similar to, the particular portion or location on the test object corresponding to the particular detector channel and the corresponding particular offset correction. It will be appreciated that such embodiments do not generally provide all of the potential benefits and advantages provided by various other embodiments according to this invention. Nevertheless, such embodiments may still provide at least certain potential benefits and advantages according to the principles of this invention, and provide certain other economic advantages, measurement speed advantages, or the like, that are desirable for various interferometer applications or designs.

Thus, while various exemplary embodiments of the invention have been illustrated and described above, it will be appreciated that various changes can be made therein without departing from the spirit and scope of the invention.

The invention claimed is:

1. A method for providing a signal usable to determine an offset correction for an offset component of an interferometry measurement signal provided by a detector channel in an interferometer, the interferometer comprising a reference beam path, an object beam path, at least one respective detector channel that comprises a respective detector, and an illumination source operable to provide varying-wavelength illumination, the method comprising:

operating the respective detector of at least one detector channel to provide a respective signal integration period;

operating the illumination source to provide a varying-wavelength illumination for the interferometer such that the varying-wavelength illumination varies over a wavelength range to provide a plurality of wavelengths distributed over the wavelength range during at least a portion of the respective signal integration period;

inputting a respective interference light optical signal into the respective detector during at least a portion of the respective signal integration period, the respective interference light arising from the varying-wavelength illumination for the interferometer; and integrating a signal arising in the detector in response to the respective interference light optical signal during the respective signal integration period to provide a respective integrated signal, wherein:

the plurality of wavelengths distributed over a wavelength range correspond to a plurality of optical phases of the respective interference light optical signal during at least a portion of the respective signal integration period, the plurality of optical phases distributed over an optical phase shift range corresponding to the wavelength range;

the wavelength range corresponds to an optical phase shift range of at least 360 degrees; and the respective integrated signal is usable to determine an offset correction for an offset component of at least one interferometry measurement signal provided by at least that respective detector channel of the interferometer.

2. The method of claim 1, wherein the varying-wavelength illumination is varied over a wavelength range to provide a plurality of wavelengths distributed over the wavelength range a plurality of times during at least a portion of the respective signal integration period, the plurality of times comprising at least one of 10 times, 20 times, and 40 times.

3. The method of claim 1, wherein the wavelength range corresponds to an optical phase shift range of N times 360 degrees, where N is a number greater than at least one of 10, 20, and 40.

4. The method of claim 1, wherein operating the illumination source to provide a varying-wavelength illumination for the interferometer comprises operating the illumination source such that the varying-wavelength illumination varies continuously over the wavelength range to provide a plurality of wavelengths distributed continuously over the wavelength range, and the wavelength varies in a way comprising one of a) monotonically, b) monotonically and at an approximately constant rate of change, and c) repetitively over the wavelength range, during at least a portion of the respective signal integration period.

5. The method of claim 1, wherein the respective signal integration period is shorter than at least one of 67 milliseconds, 34 milliseconds, 10 milliseconds, 1 millisecond, 200 microseconds, 100 microseconds, 20 microseconds and 5 microseconds.

6. The method of claim 1, wherein the wavelength range includes at least one of a) at least one respective wavelength used to provide at least one respective interferometry measurement signal in the interferometer, and b) at least two respective wavelengths used to provide at least two respective interferometry measurement signals in the interferometer, the at least two respective interferometry measurement signals comprising at least part of a set of signals combined to provide an absolute distance measurement in the interferometer.

7. The method of claim 1, wherein the wavelength range corresponds to at most 2 nanometers of wavelength change during the at least a portion of the respective signal integration period.

8. The method of claim 1, wherein the at least a portion of the respective signal integration period comprises the entire respective signal integration period.

9. The method of claim 1, wherein the interferometer is configured such that:
the at least one respective detector channel that comprises a respective detector comprises at least one respective set of at least first and second respective detector channels having at least first and second respective detectors that receive respective interference light optical signals;
the respective interference light optical signals of each at least one respective set of at least first and second respective detector channels correspond to light from a respective set of at least first and second at least approximately congruent portions of a test object positioned in the object beam path, each respective set of at least first and second at least approximately congruent portions corresponding to a respective nominal location on the test object; and
at least two of the respective interference light optical signals of each respective set have different respective relative phases, and
wherein the method comprises:
for at least one respective set, performing the method to provide a respective set of at least first and second respective integrated signals corresponding to the at least first and second respective detector channels of the respective set; and
determining an offset correction for an offset component of at least one interferometry measurement signal provided by at least that respective detector channel of the interferometer comprises at least one of:
for at least one of the at least one respective set using each of the at least first and second respective integrated signals of that respective set separately to provide at least first and second separate offset corrections, each of the at least first and second separate offset corrections usable to correct at least an interferometry measurement signal provided by the corresponding one of the at least first and second respective detector channels of that respective set, and
for at least one of the at least one respective set using at least a first combination comprising at least two of the at least first and second respective integrated signals of that respective set to provide at least a first combined offset correction, each such combined offset correction usable to correct at least interferometry measurement signals provided by any one of the respective detector channels corresponding to the at least two of the at least first and second respective integrated signals of that respective set used in combination to provide that combined offset correction.

10. The method of claim 9, wherein, for at least one of the at least one respective set, at least two of the at least first and second respective detector channels are usable to provide at least two interferometry measurement signals having different respective relative phases and having their respective offset components corrected using an offset correction determined according to the method, the at least two respective interferometry measurement signals combinable to provide an interpolated interferometer measurement corresponding to a respective nominal location on the test object that is relatively free of offset-induced errors.

11. The method of claim 9, wherein for at least one respective set using at least a first combination of at least two of the at least first and second respective integrated signals of that respective set to provide at least a first combined offset correction comprises using an average based at least partly on at least two of the at least first and second respective integrated signals of that respective set to provide at least a first combined offset correction.

12. The method of claim 9, wherein for at least one respective set the at least a portion of the respective signal integration period corresponding to performing the method to provide at least a first one of the at least first and second respective integrated signals and the at least a portion of the respective signal integration period corresponding to performing the method to provide at least a second one of the at least first and second respective integrated signals fulfills at least one of the conditions that a) they at least partially overlap in time, and b) they are substantially simultaneous.

13. The method of claim 12, wherein for at least one respective set the at least a portion of the respective signal integration period corresponding to performing the method to provide at least a first one of the at least first and second respective integrated signals and the at least a portion of the respective signal integration period corresponding to performing the method to provide at least a second one of the at least first and second respective integrated signals are made substantially simultaneous by operating the interferometer to provide a pulsed illumination period that is used throughout the interferometer, the pulsed illumination period simultaneously determining each at least a portion of the respective signal integration period.

14. The method of claim 12, wherein for at least one respective set:
the at least a portion of the respective signal integration period corresponding to performing the method to provide at least a first one of the at least first and second respective integrated signals at least partially overlaps in time with the at least a portion of the respective signal integration period corresponding to performing the method to provide at least a second one of the at least first and second respective integrated signals;
each of those respective at least a portion of the respective signal integration periods comprise their entire respective signal integration period;
the varying-wavelength illumination wavelength is varied monotonically and at an approximately constant rate at least throughout a time period corresponding to a first starting and a last ending of those entire respective signal integration periods and is provided from a single illumination source such that the corresponding respective interference light optical signals corresponding to at least the first and second respective integrated signals simultaneously undergo a number of optical phase cycles during the time period corresponding to the first starting and the last ending of those entire respective signal integration periods; and
operating the respective detector of at least the detector channel corresponding to the second one of the at least first and second respective integrated signals to provide a respective signal integration period comprises operating that respective detector to provide a respective integration period that starts N+¼ optical phase cycles after the start of the respective integration period corresponding to the first one of the at least first and second respective integrated signals, where N is an integer that is at least zero.

15. The method of claim 14, wherein operating that respective detector to provide a respective integration period that starts N+¼ optical phase cycles after the start of the respective integration period corresponding to the first one of the at least first and second respective integrated signals further comprises operating that respective detector to provide a respective integration period that ends at a time that is one of a) substantially the same time as the respective integration period corresponding to the first one of the at least first and second respective integrated signals and b) after the end of the respective integration period corresponding to the first one of the at least first and second respective integrated signals.

16. The method of claim 1, wherein the illumination source operable to provide varying-wavelength illumination is further operable to provide at least one relatively stable wavelength of illumination usable to provide interferometry measurement signals in the interferometer.

17. The method of claim 1, wherein the offset correction for an offset component of at least one interferometry measurement signal provided by at least that respective detector channel of the interferometer is based entirely on the respective integrated signal.

18. The method of claim 1, wherein the offset correction for an offset component of at least one interferometry measurement signal provided by at least that respective detector channel of the interferometer is based at least partly on the respective integrated signal and at least partly on a duration of the respective signal integration period.

19. An interferometer system operable for providing a signal usable to determine an offset correction for an offset component of an interferometry measurement signal provided by a detector channel in an interferometer, the interferometer comprising:
a reference beam path;
an object beam path;
at least one respective detector channel that comprises a respective detector;
an illumination source operable to provide varying-wavelength illumination; and
a control system portion,
wherein:
the respective detector of at least one detector channel is operable to provide a respective signal integration period;
the illumination source is operable to provide a varying-wavelength illumination for the interferometer such that the varying-wavelength illumination varies over a wavelength range to provide a plurality of wavelengths distributed over the wavelength range during at least a portion of the respective signal integration period;
the interferometer system is operable to input a respective interference light optical signal into the respective detector during at least a portion of the respective signal integration period, the respective interference light arising from the varying-wavelength illumination for the interferometer;
the respective detector is operable to integrate a signal arising in the detector in response to the respective interference light optical signal during the respective signal integration period to provide a respective integrated signal corresponding to that respective detector channel;

wherein:

the plurality of wavelengths distributed over a wavelength range correspond to a plurality of optical phases of the respective interference light optical signal during at least a portion of the respective signal integration period, the plurality of optical phases distributed over an optical phase shift range corresponding to the wavelength range;

the wavelength range corresponds to an optical phase shift range of at least 360 degrees; and the control system is operable to input the respective integrated signal corresponding to that respective detector channel and determine an offset correction for an offset component of at least one interferometry measurement signal provided by at least that respective detector channel of the interferometer, the offset correction based at least partly on the input respective integrated signal.

20. The interferometer system of claim 19, wherein the illumination source is operable such that the varying-wavelength illumination is varied over a wavelength range to provide a plurality of wavelengths distributed over the wavelength range a plurality of times during at least a portion of the respective signal integration period, the plurality of times comprising at least one of 10 times, 20 times, and 40 times.

21. The interferometer system of claim 19, wherein the wavelength range corresponds to an optical phase shift range of N times 360 degrees, where N is a number greater than at least one of least one of 10, 20, and 40.

22. The interferometer system of claim 19, wherein the illumination source is operable to vary the varying-wavelength illumination continuously over the wavelength range to provide a plurality of wavelengths distributed continuously over the wavelength range, and such that the wavelength varies in a way comprising one of a) monotonically, b) monotonically and at an approximately constant rate of change, and c) repetitively over the wavelength range, during at least a portion of the respective signal integration period.

23. The interferometer system of claim 19, wherein the respective detector is operable to provide a respective signal integration period that is shorter than at least one of 67 milliseconds, 34 milliseconds, 10 milliseconds, 1 millisecond, 200 microseconds, 100 microseconds, 20 microseconds and 5 microseconds.

24. The interferometer system of claim 19 wherein:
the at least one respective detector channel comprises at least one respective set of at least first and second respective detector channels having at least first and second respective detectors that receive respective interference light optical signals;

the interferometer is configured such that the respective interference light optical signals of each at least one respective set correspond to a light from a respective set of at least first and second at least approximately congruent portions of a test object positioned in the object beam path, each respective set of at least first and second at least approximately congruent portions corresponding to a respective nominal location on the test object; and the interferometer comprises a multiple phase shift generating portion configured such that at least two of the respective interference light optical signals of each respective set have different respective relative phases, wherein, for at least one respective set:

the interferometer system is operable to provide at least first and second respective integrated signals corresponding to the at least first and second respective detector channels; and the control system is operable to input the at least first and second respective integrated signals corresponding to the at least first and second respective detector channels, and determine an offset correction for an offset component of at least one interferometry measurement signal provided by at least one of the at least first and second respective detector channels, the control system operable to determine an offset correction by at least one of:

using each of the input at least first and second respective integrated signals separately to provide at least first and second separate offset corrections, such that each of the at least first and second separate offset corrections is appropriately usable to correct at least an interferometry measurement signal provided by the corresponding one of the at least first and second respective detector channels, and using at least a first combination comprising at least two of the input at least first and second respective integrated signals to provide at least a first combined offset correction, such that each such combined offset correction is appropriately usable to correct at least interferometry measurement signals provided by any one of the respective detector channels corresponding to the input at least two of the at least first and second respective integrated signals used in combination to provide that combined offset correction.

25. The interferometer system of claim 24, wherein for at least one respective set:

at least two of the at least first and second respective detector channels are operable to provide at least two respective interferometry measurement signals having different respective relative phases;

the control system of the interferometer is operable to correct the respective offset components of the at least two respective interferometry measurement signals having different respective relative phases using at least one appropriately usable offset correction to provide at least two respective resulting offset-corrected interferometry measurement signals having different respective relative phases; and the control system of the interferometer is operable to combine the at least two respective resulting offset-corrected interferometry measurement signals having different respective relative phases to provide an interpolated interferometer measurement corresponding to the respective nominal location on the test object that is relatively free of offset-induced errors.

26. The interferometer system of claim 24, wherein for at least one respective set the control system determines an average based at least partly on at least two of the at least first and second respective integrated signals to provide at least a first combined offset correction.

27. The interferometer system of claim 24, wherein for at least one respective set the interferometer system is operable such that the at least a portion of the respective signal integration period corresponding to at least a first one of the at least first and second respective integrated signals and the at least a portion of the respective signal integration period corresponding to at least a second one of the at least first and second respective integrated signals fulfills at least one of the conditions that a) they at least partially overlap in time, and b) they are substantially simultaneous.

28. The interferometer system of claim 27, wherein the control system is operable to make the at least a portion of the respective signal integration period corresponding to at least a first one of the at least first and second respective integrated signals and the at least a portion of the respective signal integration period corresponding at least a second one of the at least first and second respective integrated signals substantially simultaneous by controlling a pulsed illumination period that is used throughout the interferometer, the pulsed illumination period simultaneously determining each at least a portion of the respective signal integration period.

29. The interferometer system of claim 27, wherein:

each of the at least a portion of the respective signal integration periods corresponding to at least a first respective integrated signal and at least a second respective integrated signal of the at least first and second respective integrated signals comprise their entire respective signal integration period;

the interferometer system is operable such that at least a portion of the entire respective signal integration period corresponding to the first respective integrated signal of the at least first and second respective integrated signals at least partially overlaps in time with at least a portion of the entire respective signal integration period corresponding to the second respective integrated signal of the at least first and second respective integrated signals;

the illumination source is operable such that the varying-wavelength illumination wavelength varies monotonically and at an approximately constant rate at least throughout a time period corresponding to a first starting and a last ending of those entire respective signal integration periods and the interferometer is configured to provide all varying wavelength illumination from a single illumination source such that the corresponding respective interference light optical signals corresponding to at least the first and second respective integrated signals simultaneously undergo a number of optical phase cycles during the time period corresponding to the first starting and the last ending of those entire respective signal integration periods; and the interferometer system is operable such that the respective detector corresponding to the second one of the at least first and second respective integrated signals starts its respective integration period $N+\frac{1}{4}$ optical phase cycles after the start of the respective integration period corresponding to the first one of the at least first and second respective integrated signals, where N is an integer that is at least zero.

30. The interferometer system of claim 29, wherein the interferometer system is further operable such that the respective detector corresponding to the second one of the at least first and second respective integrated signals ends its respective signal integration period at a time that is one of a) substantially the same time as the respective signal integration period corresponding to the first one of the at least first and second respective integrated signals and b)

after the end of the respective integration period corresponding to the first one of the at least first and second respective integrated signals.

31. The interferometer system of claim 24, wherein the interferometer further comprises at least one two-dimensional camera and each at least one respective set of at least first and second respective detector channels has at least first and second respective detectors that comprise pixels of the at least one two-dimensional camera, wherein:
- a set of the interpolated interferometer measurements corresponding to respective nominal locations on the test object are usable to provide a two-dimensional surface height profile of at least a portion of the test object, the two-dimensional surface height profile being relatively free of offset-induced errors.

32. The interferometer system of claim 19, wherein the illumination source that is operable to provide varying-wavelength illumination is also operable to provide at least one relatively stable wavelength of illumination usable to provide interferometry measurement signals in the interferometer.

33. The interferometer system of claim 19, wherein the control system is operable to determine the offset correction for an offset component of at least one interferometry measurement signal provided by at least that respective detector channel of the interferometer, based at least partly on the input respective integrated signal and based at least partly on a duration of the respective signal integration period.

34. The interferometer system of claim 19, wherein the control system is operable to determine the offset correction for an offset component of at least one interferometry measurement signal provided by at least that respective detector channel of the interferometer, based entirely on the input respective integrated signal.

* * * * *